(12) United States Patent
Sun et al.

(10) Patent No.: US 11,677,519 B2
(45) Date of Patent: Jun. 13, 2023

(54) WAVEFORM DESIGN FOR SIDELINK IN NEW RADIO-UNLICENSED (NR-U)

(71) Applicant: QUALCOMM INCORPORATED, San Diego, CA (US)

(72) Inventors: Jing Sun, San Diego, CA (US); Xiaoxia Zhang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/022,712

(22) Filed: Sep. 16, 2020

(65) Prior Publication Data

US 2021/0091901 A1    Mar. 25, 2021

Related U.S. Application Data

(60) Provisional application No. 62/903,624, filed on Sep. 20, 2019.

(51) Int. Cl.
| | |
|---|---|
| *H04L 5/00* | (2006.01) |
| *H04W 72/1263* | (2023.01) |
| *H04L 5/02* | (2006.01) |
| *H04W 72/20* | (2023.01) |
| *H04W 92/18* | (2009.01) |

(52) U.S. Cl.
CPC .......... *H04L 5/0041* (2013.01); *H04L 5/0007* (2013.01); *H04L 5/0094* (2013.01); *H04L 5/023* (2013.01); *H04W 72/1263* (2013.01); *H04W 72/20* (2023.01); *H04W 92/18* (2013.01)

(58) Field of Classification Search
CPC ... H04L 5/0041; H04L 5/0007; H04L 5/0094; H04L 5/023; H04L 5/0005; H04W 72/1263; H04W 72/1278; H04W 92/18; H04W 8/20; H04W 74/002
See application file for complete search history.

(56) References Cited

U.S. PATENT DOCUMENTS

| | | | |
|---|---|---|---|
| 2017/0171690 A1* | 6/2017 | Kim | H04L 51/02 |
| 2018/0368090 A1* | 12/2018 | Kadambar | H04W 76/14 |
| 2019/0173612 A1* | 6/2019 | Kimura | H04W 56/001 |
| 2020/0053528 A1* | 2/2020 | Wang | H04W 72/044 |
| 2021/0160852 A1* | 5/2021 | Zhao | H04L 5/0039 |

OTHER PUBLICATIONS

International Search Report and Written Opinion—PCT/US2020/051337—ISA/EPO—dated Nov. 13, 2020.
(Continued)

*Primary Examiner* — Ian N Moore
*Assistant Examiner* — Brian T Le
(74) *Attorney, Agent, or Firm* — Haynes and Boone LLP

(57) ABSTRACT

Wireless communications systems and methods related to sidelink communications in a shared radio frequency band are provided. A first user equipment (UE) receives, from a base station (BS), a configuration for frequency-interlaced resources in a shared radio frequency band for sidelink communication between the first UE and a second UE. The first UE communicates, with the second UE, the sidelink communication using the frequency-interlaced resources.

16 Claims, 15 Drawing Sheets

(56) References Cited

OTHER PUBLICATIONS

Samsung: "Interlaced Transmissions for Co-Existence with DSRC", 3GPP Draft, 3GPP TSG RAN WG1 Meeting #85, R1-164792, Mobile Competence Centre, 650, Route Des Lucioles, F-06921 Sophia-Antipolis Cedex, vol. RAN WG1, No. Nanjing, May 23, 2016-May 27, 2016, May 13, 2016 (May 13, 2016), XP051096708, 6 Pages, Retrieved from the Internet: URL: http://www.3gpp.org/ftp/tsg_ran/WG1_RL1/TSGR1_85/Docs/. [retrieved on May 13, 2016] section 2.1; figures 1, 2; table 1.

* cited by examiner

WAVEFORM DESIGN FOR SIDELINK IN NEW RADIO-UNLICENSED (NR-U)

CROSS REFERENCE TO RELATED APPLICATIONS

The present application claims priority to and the benefit of U.S. Provisional Patent Application No. 62/903,624, filed Sep. 20, 2019, which is hereby incorporated by reference in its entirety as if fully set forth below and for all applicable purposes.

TECHNICAL FIELD

This application relates to wireless communication systems, and more particularly to sidelink communications between user equipment devices (UEs) in a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first user equipment (UE) from a base station (BS), a configuration for frequency-interlaced resources in a shared radio frequency band for sidelink communication between the first UE and a second UE; and communicating, by the first UE with the second UE, the sidelink communication using the frequency-interlaced resources.

In an additional aspect of the disclosure, a method of wireless communication includes determining, by a base station (BS), a configuration for frequency-interlaced resources in a shared radio frequency band for sidelink communication between a first user equipment (UE) and a second UE; and transmitting, by the BS to the first UE, the configuration for the sidelink communication.

In an additional aspect of the disclosure, a first user equipment (UE) includes a transceiver configured to receive, from a base station (BS), a configuration for frequency-interlaced resources in a shared radio frequency band for sidelink communication between the first UE and a second UE; and communicate, with the second UE, the sidelink communication using the frequency-interlaced resources.

In an additional aspect of the disclosure, a base station (BS) includes a processor configured to determine a configuration for frequency-interlaced resources in a shared radio frequency band for sidelink communication between a first user equipment (UE) and a second UE; and a transceiver configured to transmit, to the first UE, the configuration for the sidelink communication.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
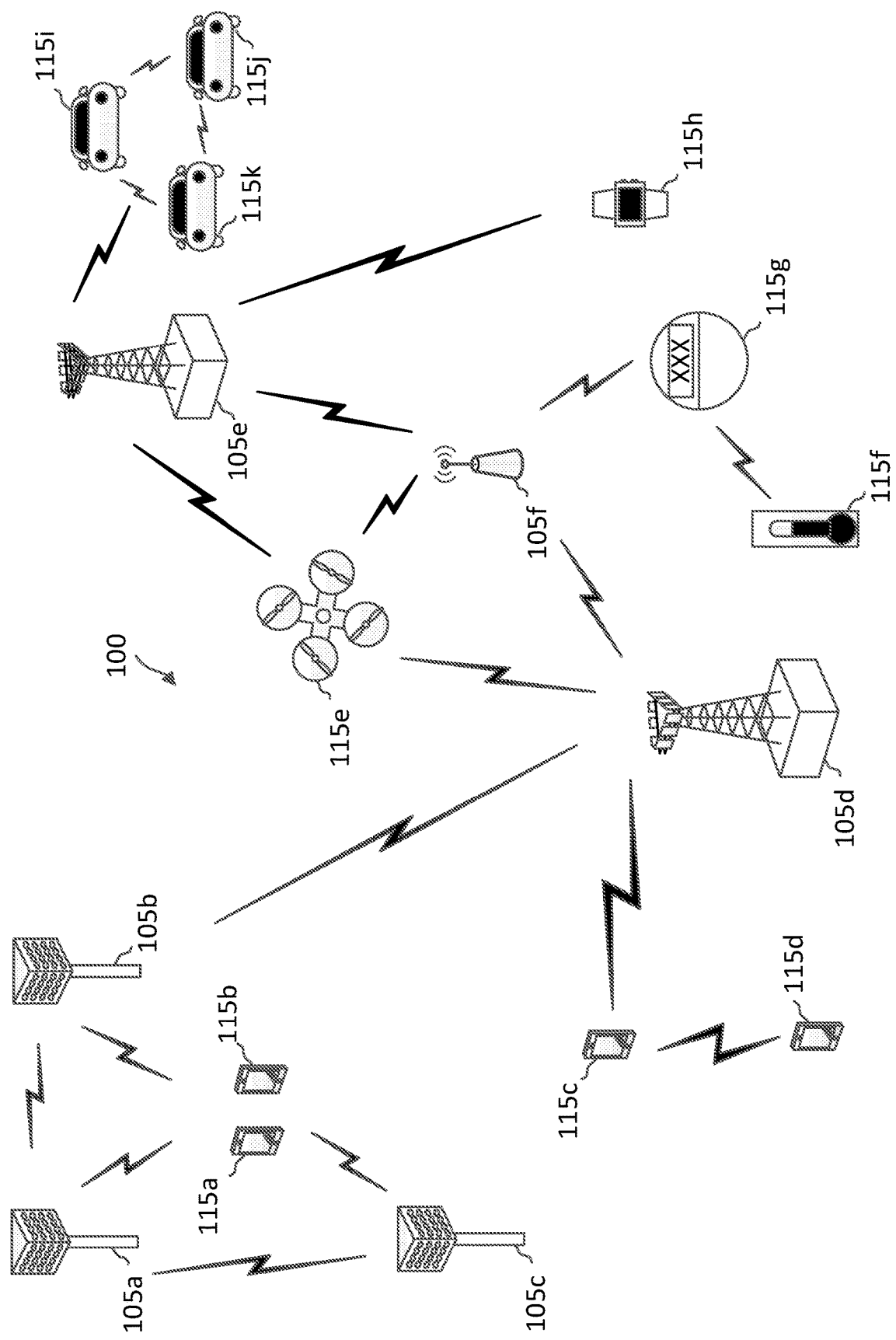
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g.,~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for sidelink communications in a shared radio frequency band using frequency-interlaced waveforms. The shared radio frequency band may be part of a shared spectrum or an unlicensed spectrum. For example, a BS may configure a first UE with a frequency interlace resource pool for sidelink communications between the first UE and the second UE. The frequency interlace resource pool may include a plurality of frequency domain physical resource block (PRB) interlaces in the shared radio frequency band. Each frequency domain PRB interlace may include a set of PRBs uniformly spaced in the shared radio frequency band. The sidelink communications may include a physical sidelink shared channel (PSSCH) and a physical sidelink control channel (PSCCH). The PSSCH may carry data and the PSCCH may carry control information including transmission parameters used for transmitting the data in the PSSCH. The BS may configure the first UE to multiplex PSSCH and PSCCH on the same frequency interlace using frequency-division-multiplexing (FDM) or time-division-multiplexing (TDM). When employing FDM, the BS may configure a highest-frequency PRB and a lowest-frequency PRB in the frequency interlace for PSCCH communication to provide frequency diversity.

In some aspects, the first UE may assign additional frequency domain resources and/or time domain resources for communicating PSSCH data. In this regard, the first UE may assign one or more additional frequency interlace of PSSCH data communication. Alternatively or additionally, the first UE may apply slot aggregation to assign one or more additional time slots for PSSCH data communication. In some aspects, the first UE may select the additional resources from the frequency interlace resource pool. In some aspects, the first UE may indicate the additional PSSCH resources in the PSCCH control information.

Aspects of the present disclosure can provide several benefits. For example, the use of frequency interlaced waveforms for sidelink transmission may allow the sidelink transmission to meet a certain bandwidth occupancy requirement (e.g., a BW occupancy requirement of about 80%) of the shared radio frequency band. Additionally, the use of the frequency interlaced waveforms may allow the sidelink transmission to be transmitted at an increased power while meeting a certain maximum allowable power spectral density (PSD) of the shared radio frequency band. Further, the use of an unlicensed spectrum for sidelink communication can offload traffic from licensed spectrum.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). ABS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. Certain frequency bands may have certain BW occupancy requirements and/or a maximum allowable power spectral density (PSD). To meet BW occupancy requirements and/or boost transmit power under certain PSD limitations, sidelink transmissions in the network 100 may use a frequency-interlaced waveform. Mechanisms for sidelink communications using frequency interlaces are described in greater detail herein.

Figure 2:
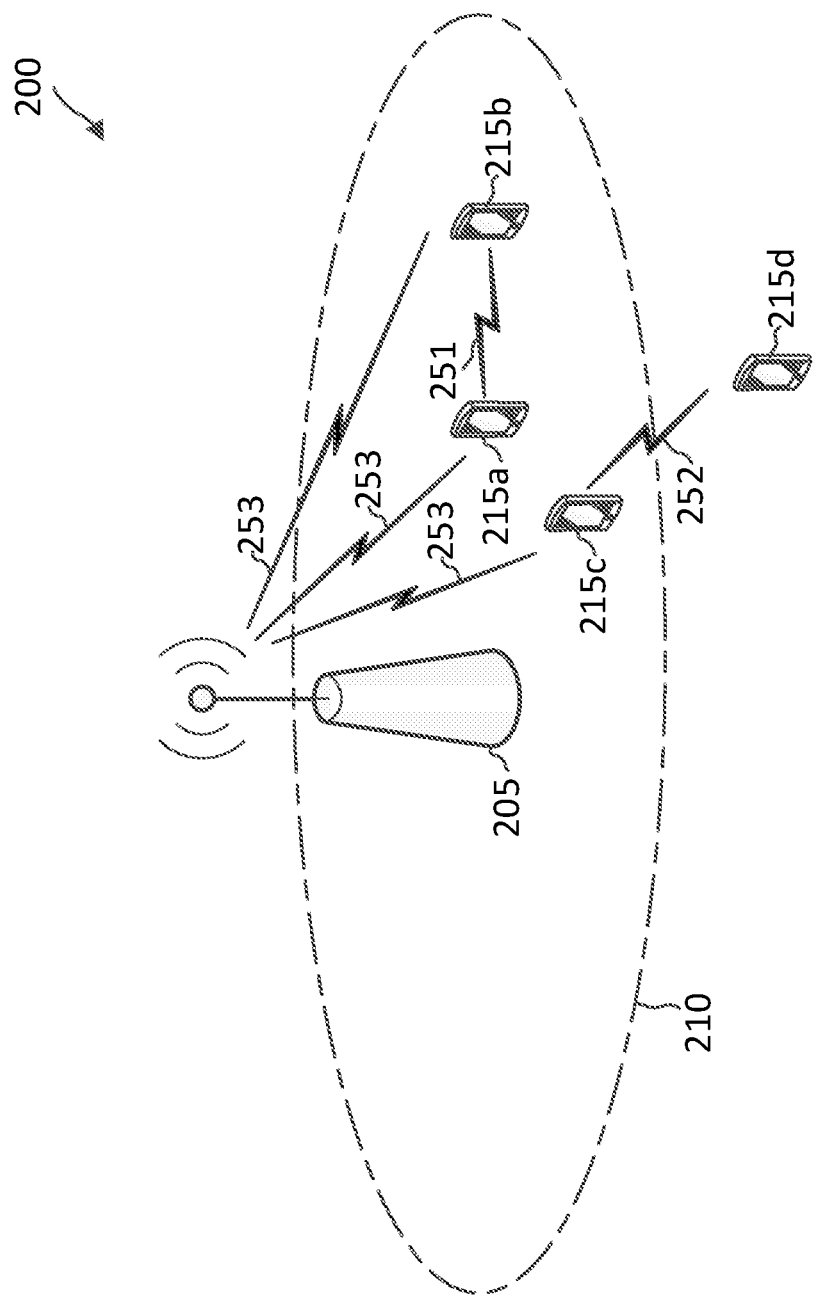
FIG. 2 illustrates a wireless communication network that provisions for sidelink communications according to some aspects of the present disclosure.

FIG. 2 illustrates an example of a wireless communication network 200 that provisions for sidelink communications according to embodiments of the present disclosure. The network 200 may be similar to the network 100. FIG. 2 illustrates one BSs 205 and four UEs 215 for purposes of simplicity of discussion, though it will be recognized that embodiments of the present disclosure may scale to any suitable number of UEs 215 and/or BSs 205 (e.g., the about 2, 3, 6, 7, 8, or more). The BS 205 and the UEs 215 may be similar to the BSs 105 and the UEs 115, respectively. The BSs 205 and the UEs 215 may communicate over the same spectrum.

In the network 200, some of the UEs 215 may communicate with each other in peer-to-peer communications. For example, the UE 215a may communicate with the UE 215b over a sidelink 251, and the UE 215c may communicate with the UE 215d over another sidelink 252. The sidelinks 251 and 252 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d is outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

In some aspects, the network 200 may be a LTE network. The transmissions by the UE 215a and the UE 215b over the sidelink 251 and/or the transmissions by the UE 215c and the UE 215d over the sidelink 252 may reuse a LTE PUSCH waveform, which is a discrete Fourier transform-spreading (DFT-s) based waveform. In some aspects, the network 200 may be an NR network. The transmissions by the UEs 215 over the sidelinks 251 and/or 252 may use a cyclic-prefix-OFDM (CP-OFDM) waveform.

Figure 3:
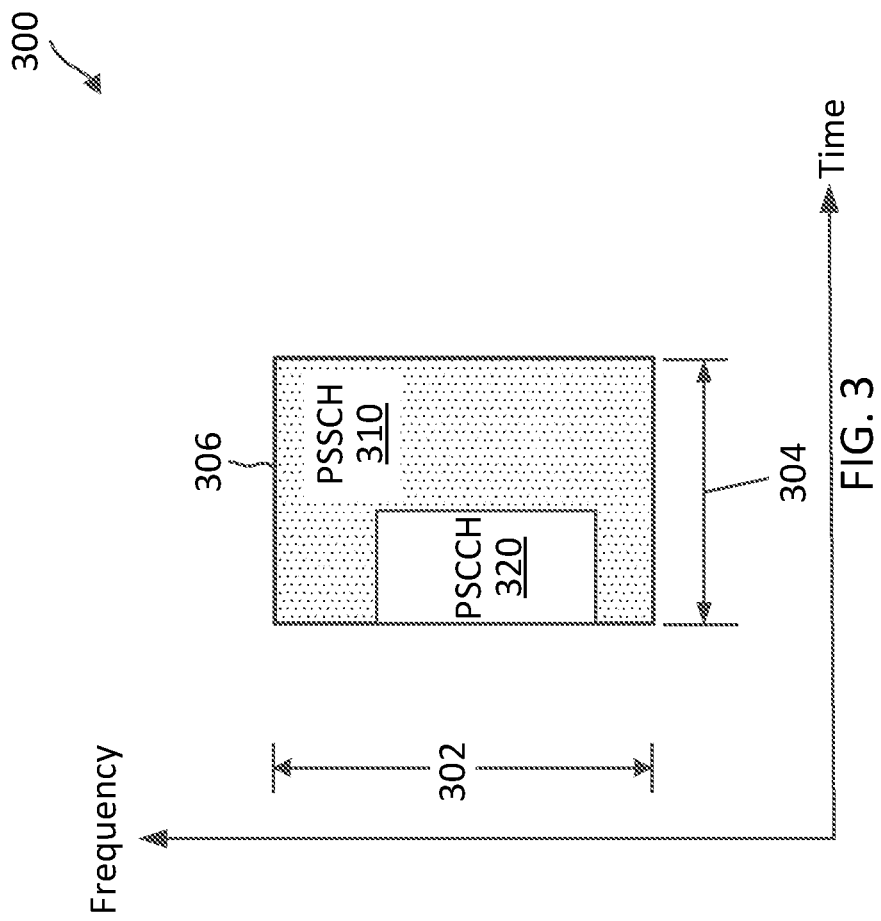
FIG. 3 illustrates a sidelink communication scheme according to some aspects of the present disclosure.

FIG. 3 illustrates a sidelink communication scheme 300 according to some aspects of the present disclosure. The scheme 300 may be employed by BSs such as the BSs 105 and 205 and UEs such as the UEs 115 and 215 in a network such as the network 100. In some instances, the network may be an NR network. In FIG. 3, the x-axis represents time in some arbitrary units, and the y-axis represents frequency in some arbitrary units. In the scheme 300, a BS (e.g., the BSs 105 and/or 205) may configure a UE (e.g., the UEs 115 and/or 215) with resources 306 in the frequency band 302 during the time period 304 for sidelink communications with another UE. The sidelink communications may include PSSCH communication 310 and PSCCH communication 320. The PSSCH communications 310 may include data. The PSCCH communications 320 may include control information associated with the transmissions of the PSCCH communications 310. The PSSCH communications 310 may be substantially similar to PDCCH communications between a BS and a UE. While there may not be a CORESET defined for the PSCCH communication 310 as in the PDCCH communication, a UE may be required to perform monitoring and blind decoding to receive the PSCCH communication 310. The resources 306 may be in the form of resource blocks. As shown, the PSCCH communications 320 is embedded within the PSSCH communication 310. In some instances, the PSCCH communications 320 and the PSSCH communication 310 may use a CP-OFDM waveform for transmissions.

The scheme 300 may be suitable when the sidelink communication is over a licensed band. For sidelink communication over a shared radio frequency band or unlicensed band, the sidelink communication may be required to satisfy certain power spectral density (PSD) requirements and/or occupancy channel bandwidth (OCB) requirements.

Accordingly, the present disclosure provides techniques for sidelink communications over an unlicensed band using frequency-interlaced waveforms to meet OCB requirements and allow for a higher total transmit power without exceeding a certain PSD limitation.

Figure 4:
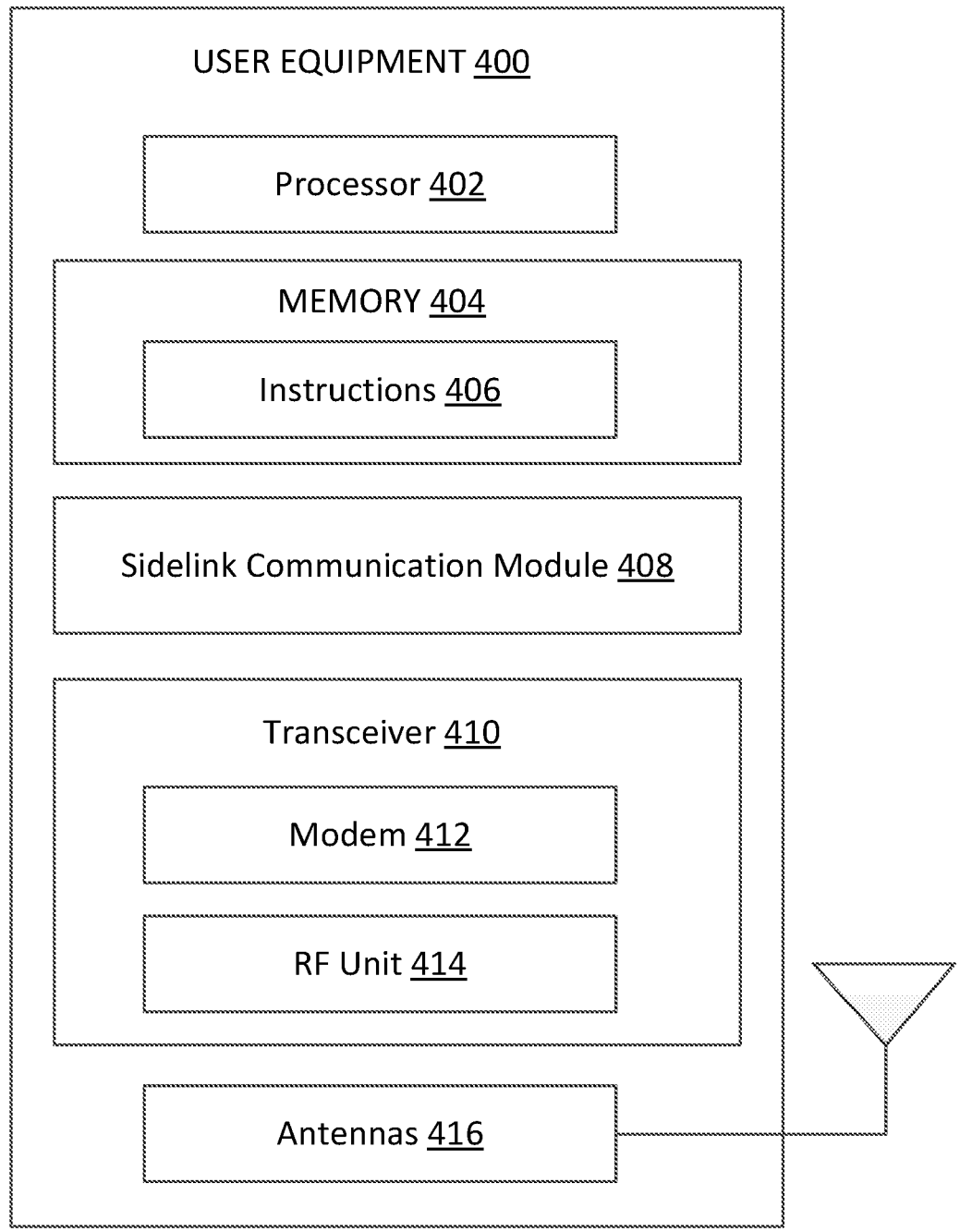
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an sidelink communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 6-13. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 408 may be implemented via hardware, software, or combinations thereof. For example, the sidelink communication module 408 may be implemented as a processor, circuit, and/or instructions 406 stored in the memory 404 and executed by the processor 402. In some instances, the sidelink communication module 408 can be integrated within the modem subsystem 412. For example, the sidelink communication module 408 can be implemented by a combination of software components (e.g., executed by a DSP or a general processor) and hardware components (e.g., logic gates and circuitry) within the modem subsystem 412.

The sidelink communication module 408 may be used for various aspects of the present disclosure, for example, aspects of FIGS. 6-13. The sidelink communication module 408 is configured to receive a frequency interlace configuration from a BS (e.g., the BSs 105 and/or 205) for sidelink communication and communicate sidelink data (e.g., PSSCH data) and/or sidelink control information (e.g., PSCCH control information) with another UE based on the frequency interlace configuration. The frequency interlace configuration may indicate a pool of frequency domain PRB interlaces in a frequency band. The frequency interlace configuration may further indicate a multiplexing configuration for multiplexing PSSCH and PSCCH communication on the same frequency interlace. The multiplexing configuration may indicate a FDM or a TDM for the multiplexing. The multiplexing configuration may further indicate a highest-frequency PRB and a lowest-frequency PRB for PSSCH communication when using FDM. In some aspects, the sidelink communication module 408 is configured to multiplex PSSCH and PSCCH on the same frequency interlace using FDM based on the configuration or using TDM based on the configuration. In some aspects, the sidelink communication module 408 is configured to determine additional frequency domain resources and/or time domain resources for PSSCH communication and indicate resource allocation information associated with the additional frequency domain resources and/or time domain resources in the PSCCH via sidelink control information (SCI) signaling. In some aspects, the sidelink communication module may select the additional frequency domain resources and/or time domain resources from the pool of frequency domain PRB interlaces indicated by the configuration. Mechanisms for using interlaced waveforms for sidelink communications are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the sidelink communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSSCH data and/or PSCCH control information) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., the frequency interlace configuration, PSSCH data, and/or PSCCH control information) to the sidelink communication module 408 for processing. The antennas 416 may include multiple antennas of similar or different designs in order to sustain multiple transmission links. The RF unit 414 may configure the antennas 416.

In an example, the transceiver 410 is configured to receive a frequency interlace configuration from a BS (e.g., the BSs 105 and 205) indicating frequency-interlaced resources for sidelink communication, transmit PSSCH data, PSCCH control information, and/or feedbacks (e.g., HARQ ACK/NACK and/or channel measurement reports) to another UE, and/or receive PSSCH data, PSCCH control information, and/or feedbacks from another UE, for example, by coordinating with the sidelink communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
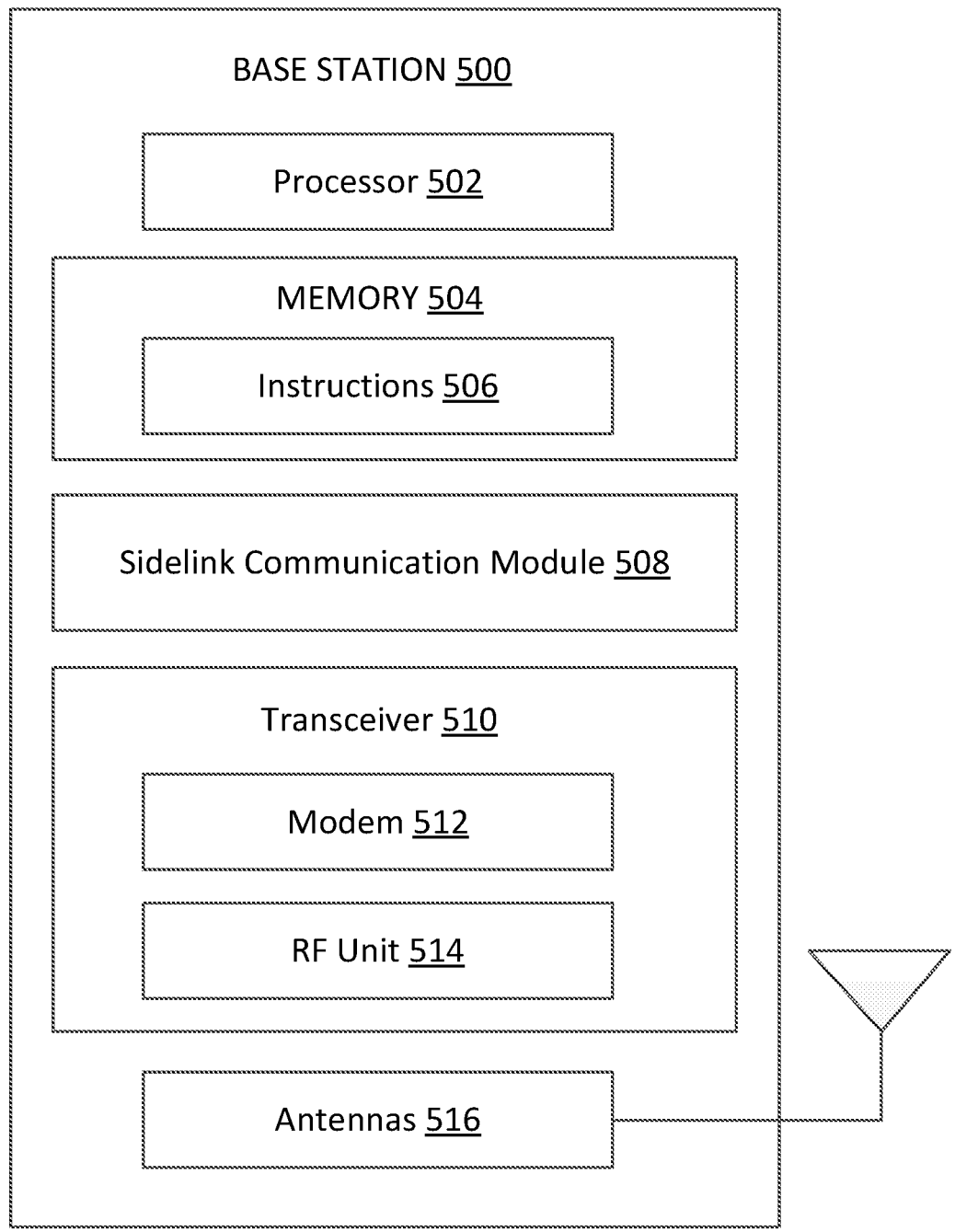
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. A shown, the BS 500 may include a processor 502, a memory 504, an sidelink communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-12 and 14. Instructions 506 may also be referred to as code, which may be interpreted broadly to include any type of computer-readable statement(s) as discussed above with respect to FIG. 4.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 6-12 and 14. The sidelink communication module 508 is configured to configured to transmit a frequency interlace configuration to a UE (e.g., the UEs 115, 215, and/or 400) for sidelink communications (e.g., PSSCH data and/or PSCCH control information) with another UE. The frequency interlace configuration may indicate a pool of frequency domain PRB interlaces in a frequency band. The frequency interlace configuration may further indicate a multiplexing configuration for multiplexing PSSCH and PSCCH communication on the same frequency interlace. The multiplexing configuration may indicate a FDM or a TDM for the multiplexing. The multiplexing configuration may further indicate a highest-frequency PRB and a lowest-frequency PRB for PSSCH communication when using FDM. Mechanisms for provisioning sidelink communications with interlaced waveforms are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., UCI, DMRS) to the sidelink communication module 508 for processing. The antennas 516 may include multiple antennas of similar or different designs in order to sustain multiple transmission links.

In an example, the transceiver 510 is configured to transmit a resource configuration to a UE (e.g., the UEs 115 and 400) indicating a frequency interlace and receive a UL control channel signal (e.g., a PUCCH signal) modulated by HARQ ACK/NACK and SR from the UE in the frequency interlace, for example, by coordinating with the sidelink communication module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
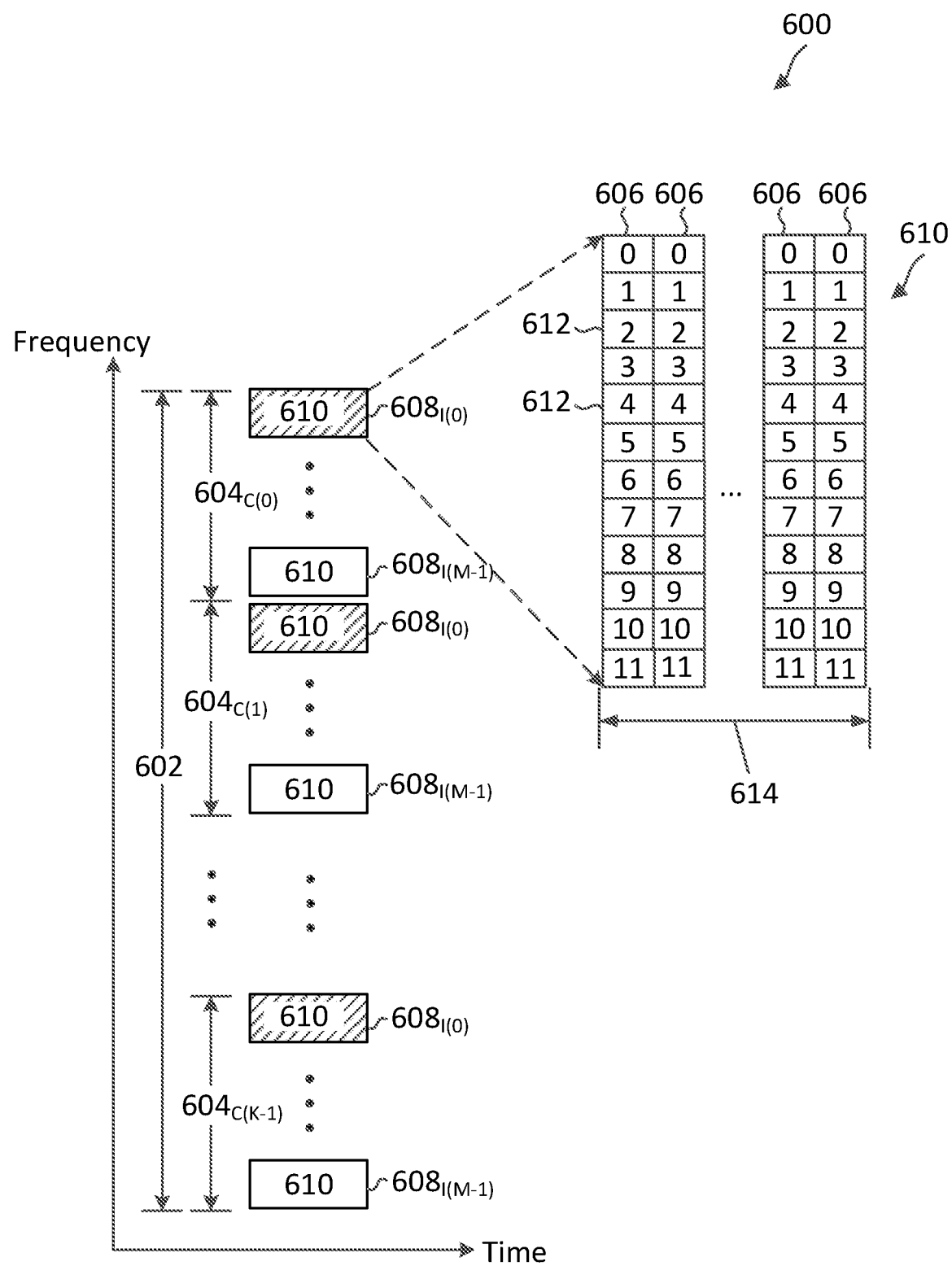
FIG. 6 illustrates a sidelink communication scheme using a frequency-interlaced waveform according to some aspects of the present disclosure.

FIG. 6 illustrates a sidelink communication scheme 600 using a frequency-interlaced waveform according to some aspects of the present disclosure. The scheme 600 may be employed by BSs such as the BSs 105 and 500 and UEs such as the UEs 115 and 400 to communicate over a frequency band 602, which may be a shared radio frequency band or an unlicensed band. In FIG. 6, the x-axis represents time in some arbitrary units, and the y-axis represents frequency in some arbitrary units. The frequency band 602 may, for example, have a bandwidth of about 10 megahertz (MHz) or about 20 MHz and a subcarrier spacing (SCS) of about 15 kilohertz (kHz), about 30 kHz, or about 20 kHz. The frequency band 602 may be located at any suitable frequencies. In some aspects, the frequency band 602 may be located at about 3.5 GHz, 6 GHz, or 60 GHz. The scheme 600 allocates resources for sidelink communications (e.g., over the sidelinks 251 and 252) between UEs (e.g., the UEs 115 and 400) in units of frequency interlaces 608.

The frequency interlaces are shown as $608_{I(0)}$ to $608_{(M-1)}$, where M is a positive integer. Each frequency interlace $608_{I(i)}$ may include K plurality of RBs 610 evenly spaced over the frequency band 602, where K is a positive integer and i may vary between 0 to M−1. In other words, the RBs 610 in a particular frequency interlace $608_{I(i)}$ are spaced apart from each other by at least one other RB 610. The frequency interlace 6081(0) as shown comprises RBs 610 from clusters $604_{C(0)}$ to $604_{C(K-1)}$. The values of K and M may vary based on several factors, such as the bandwidth, the SCS, and/or the PSD limitation of the frequency band 602, as described in greater detail herein. In an example, a BS (e.g., the BSs 105) may assign the frequency interlace $608_{I(0)}$ for sidelink communications between a pair of UEs (e.g., the UEs 115) and may assign the frequency interlace $608_{I(1)}$ for sidelink communications between another pair of UEs. The allocation of the frequency interlace $608_{I(0)}$ are shown as patterned boxes. In some other examples, the BS may assign multiple frequency interlaces 608 (e.g., frequency interlaces $608_{I(0)}$ and $608_{I(1)}$ for sidelink communications between a pair of UEs.

A group of M localized RBs 610 forms a cluster 604. As shown, the frequency interlaces $608_{I(0)}$ to $608_{(M-1)}$ form K clusters $604_{C(0)}$ to $604_{C(K-1)}$. Each RB 610 may span about twelve contiguous subcarriers 612 in frequency and a time period 614. The subcarriers 612 are indexed from 0 to 11. The subcarriers 612 are also referred to as resource elements (REs). The time period 614 may span any suitable number of OFDM symbols 606. In some aspects, the time period 614 may correspond to one transmission time interval (TTI), which may include about fourteen OFDM symbols 606.

The number of clusters 604 or the value of K may be dependent on the amount of frequency distribution required to maintain a certain BW occupancy. As an example, the scheme 600 may divide the frequency band 602 into about ten clusters 604 (e.g., K=10) and distribute an allocation over the ten clusters 604 to increase a frequency occupancy of the allocation. In an aspect, the frequency band 602 may have a bandwidth of about 20 MHz and each subcarrier 612 may span about 15 kHz in frequency. In such an aspect, the frequency band 602 may include about ten frequency interlaces 608 (e.g., M=10). For example, an allocation may include one frequency interlace 608 having ten distributed or equally spaced RBs 610. Compared to an allocation with a single RB or ten localized RBs, the interlaced allocation with the ten distributed RBs 610 allows a UE to transmit with a higher BW occupancy.

In another aspect, the frequency band 602 may have a bandwidth of about 10 MHz and each subcarrier 612 may span about 15 kHz in frequency. In such an aspect, the frequency band 602 may include about five frequency interlaces 608 (e.g., M=5). Similarly, an allocation may include one frequency interlace 608 having ten distributed RBs 610. The interlaced allocation with the ten distributed RBs may allow for a wider BW occupancy than an allocation with a single RB or ten localized RBs.

In another aspect, the frequency band 602 may have a bandwidth of about 20 MHz and each subcarrier 612 may span about 30 kHz in frequency. In such an aspect, the frequency band 602 may include about five frequency interlaces 608 (e.g., M=5). Similarly, an allocation may include one frequency interlace 608 having ten distributed RBs 610. The interlaced allocation with the ten distributed RBs may allow for a wider BW occupancy than an allocation with a single RB or ten localized RBs.

In some aspects, the RBs 610 are physical resource blocks (PRBs) and each frequency interlace 608 may include PRBs uniformly spaced in the frequency band 602.

In the scheme 600, sidelink communications over an assigned frequency interlace 608 (e.g., the frequency interlace $608_{I(0)}$) may include PSSCH communications (e.g., the PSSCH communication 310) and PSCCH communication (e.g., the PSCCH communication 320). Thus, in the scheme 600, sidelink transmissions may have a frequency-interlaced waveform. Since the frequency band 602 is a shared radio frequency band or an unlicensed band, a UE is required to perform an LBT prior to transmitting in an assigned frequency interlace 608. When the LBT is a pass, the UE may proceed to transmit PSSCH data and/or PSCCH control information to another UE using the assigned frequency interlace 608. The PSSCH control information may be transmitted in the form of SCI, which may be substantially similar to the PDCCH DCI transmitted by a BS to a UE. When the LBT fails, the UE may refrain from transmitting in the assigned frequency interlace. To reduce LBT delay, the scheme 600 may configure the UE to multiplex PSSCH and PSCCH in the same frequency interlace 608.

Figure 7:
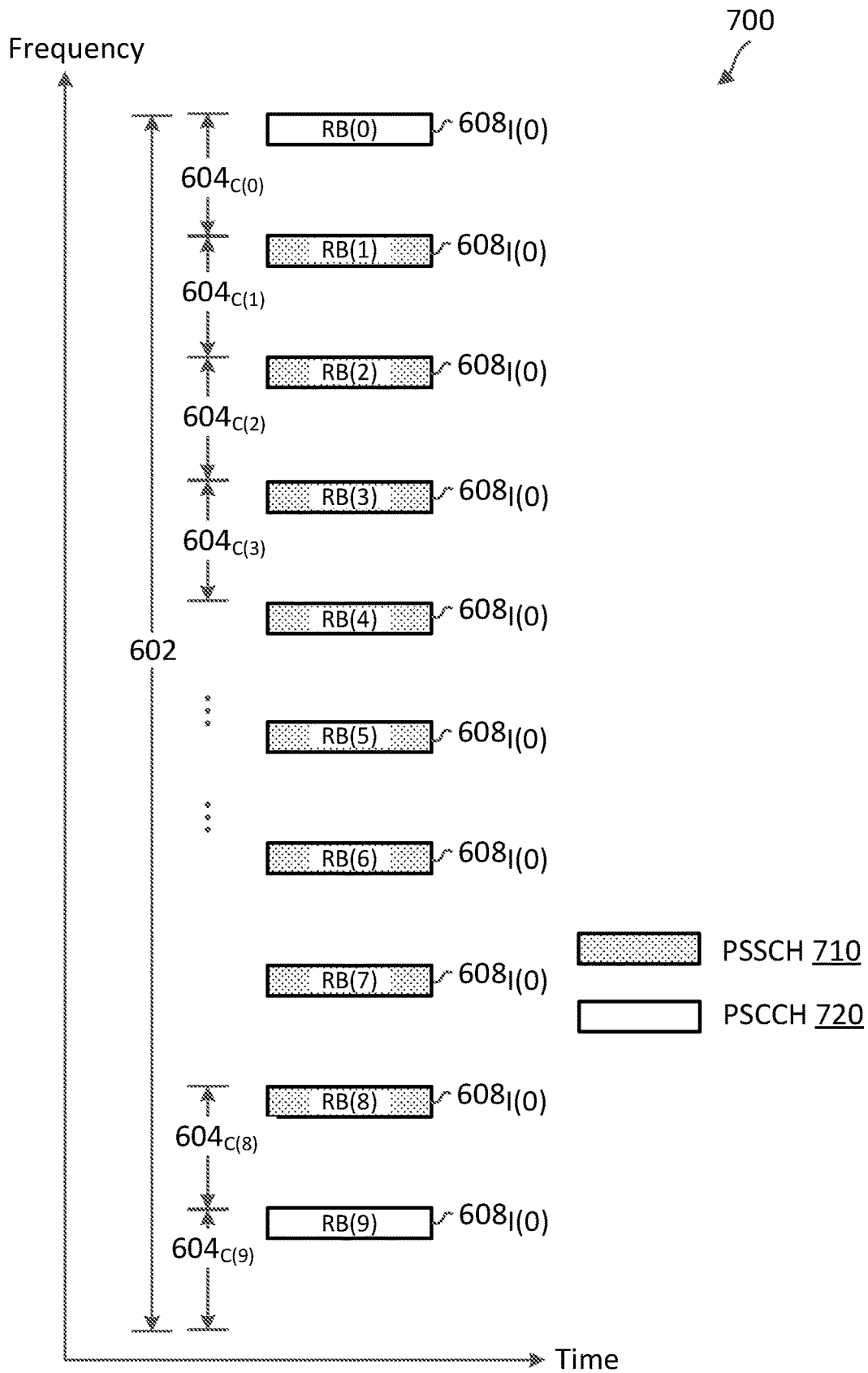
FIG. 7 illustrates a sidelink communication scheme using a frequency-interlaced waveform according to some aspects of the present disclosure.
Figure 8:
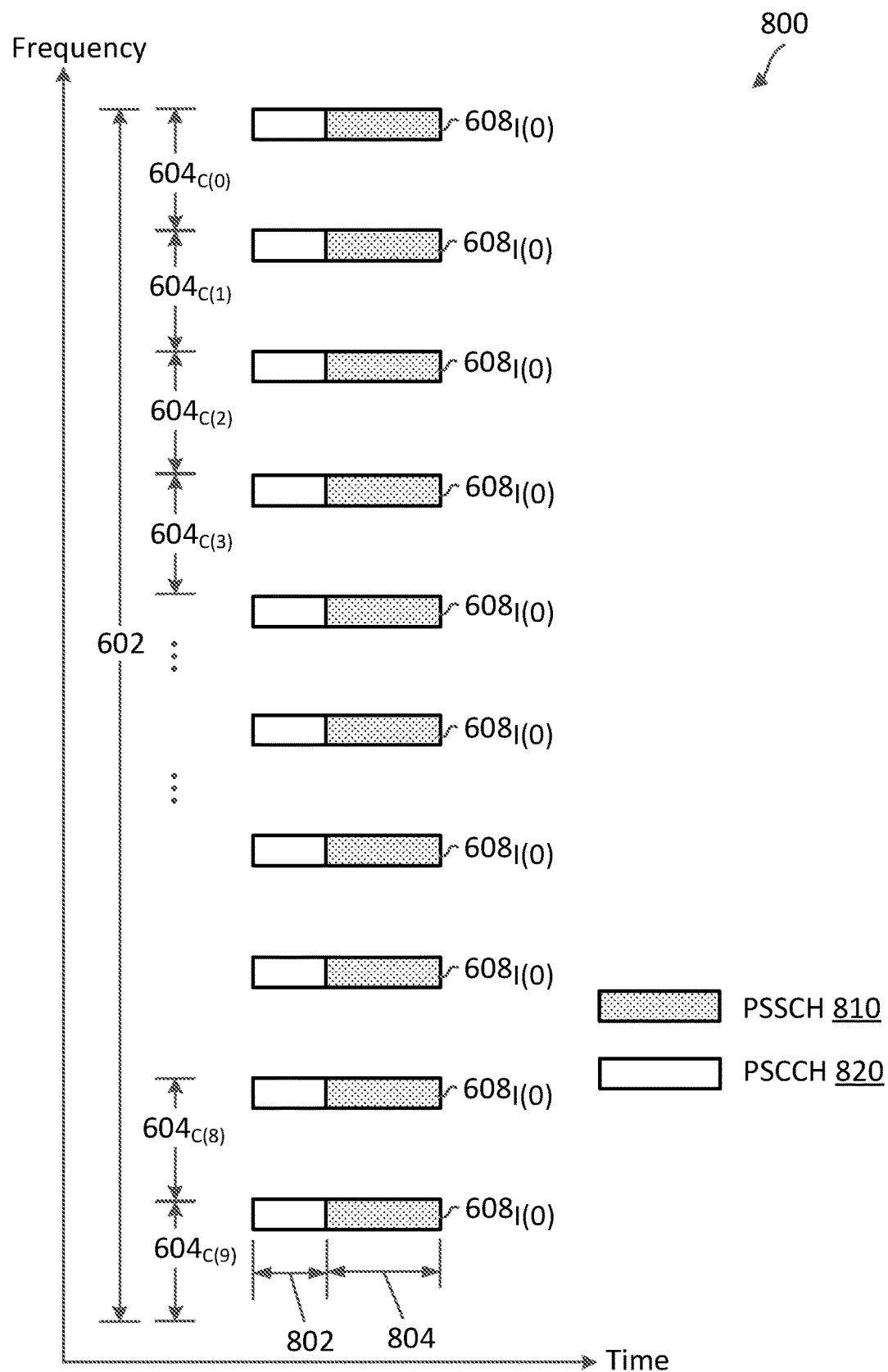
FIG. 8 illustrates a sidelink communication scheme using a frequency-interlaced waveform according to some aspects of the present disclosure.

FIGS. 7-8 illustrate various mechanisms for multiplexing a PSSCH signal (e.g., the PSSCH communication 310) and a PSCCH signal (e.g., the PSCCH communication 320) on the same frequency interlace (e.g., the frequency interlace $608_{I(0)}$). In FIGS. 7 and 8, the schemes 700 and 800 may be employed by a BS such as the BSs 105, 205, and/or 500 and a UE such as the UEs 115, 215, and/or 400 in a network such as the networks 100 and/or 200. In particular, the BS may configure the UE with a frequency interlace for sidelink communication and a multiplexing configuration for multiplexing PSSCH communication (e.g., the PSSCH communication 310) and PSCCH communication (e.g., the PSCCH communication 320). Additionally, FIGS. 7-8 are described using a similar frequency-interlaced resource structure as in the scheme 600, and may use the same reference numerals as in FIG. 6 for simplicity sake.

FIG. 7 illustrates a sidelink communication scheme 700 using a frequency-interlaced waveform according to some aspects of the present disclosure. The scheme 700 multiplexes PSSCH communication 710 and PSCCH communication 720 on the same frequency interlace $608_{I(0)}$ using FDM. The PSSCH communication 710 is similar to the PSSCH communication 310. The PSCCH communication 720 is similar to the PSCCH communication 320. For purposes of simplicity of discussion, FIG. 7 illustrates an example for a 10 MHz BW (e.g., the frequency band 602) with 15 kHz SCS and ten clusters 604 (e.g., K=10). Thus, the frequency interlace $608_{I(0)}$ may include ten RBs (e.g., the RBs 610). However, the scheme 700 may be applied to a frequency interlace with any suitable number of RBs 610 and/or any SCS. The RBs in the frequency interlace $608_{I(0)}$ are shown as RB(0) to RB(9).

In the scheme 700, a BS (e.g., the BSs 105, 205, and/or 500) may configure a first UE (e.g., the UEs 115, 215, and/or 400) with a frequency interlace 608 in the frequency band 602 for sidelink communication with a second UE (e.g., the UEs 115, 215, and/or 400) over a sidelink (e.g., the sidelinks 251 and/or 252). For example, in the illustrated example of FIG. 7, the BS configures the first UE with the frequency interlace $608_{I(0)}$ for sidelink communication with the second UE. The BS may configure the first UE with a FDM configuration for multiplexing the PSSCH communication 710 and the PSCCH communication 720 on the frequency interlace $608_{I(0)}$.

To provide a maximum frequency diversity for the PSCCH communication 720, the BS may configure the PSCCH communication 720 to be at the two ends of the frequency interlace $608_{I(0)}$. In other words, the BS may configure a highest-frequency RB (e.g., the RB(0)) and a lowest-frequency RB (e.g., the RB(9)) for the PSCCH communication 720. The PSSCH communication 710 may use the remaining RBs (e.g., the RB(1) to RB(8)) in the frequency interlace $608_{I(0)}$.

The PSSCH communication 710 may include data and the PSCCH communication 720 may include control information associated with the transmission of the data.

In some aspects, the transmission of the PSSCH communication 710 and the PSCCH communication 720 may use a CP-OFDM waveform over the frequency interlace $6081_{I(0)}$. In this regard, the first UE and/or the second UE may generate a CP-OFDM transmission signal by mapping encoded PSSCH control information and the encoded PSSCH data onto subcarriers (e.g., the subcarriers 612) of corresponding RBs of the frequency interlace $608_{I(0)}$ and performing an inverse fast Fourier transform (IFFT).

FIG. 8 illustrates a sidelink communication scheme 800 using a frequency-interlaced waveform according to some aspects of the present disclosure. The scheme 800 multiplexes PSSCH communication 810 and PSCCH communication 820 on the same frequency interlace $608_{I(0)}$ using TDM. The PSSCH communication 810 is similar to the PSSCH communications 310 and 710. The PSCCH communication 820 is similar to the PSCCH communications 320 and 720.

In the scheme 800, a BS (e.g., the BSs 105, 205, and/or 500) may configure a first UE (e.g., the UEs 115, 215, and/or 400) with the frequency interlace $608_{I(0)}$ for sidelink communication with a second UE (e.g., the UEs 115, 215, and/or 400) over a sidelink (e.g., the sidelinks 251 and/or 252). The BS may configure the first UE with a TDM configuration for multiplexing the PSSCH communication 810 and the PSCCH communication 820 on the frequency interlace $608_{I(0)}$. The BS may configure a time period 802 for the PSCCH communication 820 and another time period 804 for the PSSCH communication 810. The time period 804 may be adjacent to the time period 802 to reduce LBT delay (e.g., a single LBT may be performed before the time period 802 for the transmission of the PSCCH communication 820 and the PSSCH communication 810). In some instances, the time period 804 for the PSSCH communication 810 may include a greater number of symbols (e.g., the symbols 606) than the time period 802 for the PSCCH communication 820. In some instances, the time period 802 may include about 1-2 OFDM symbols and the time period 804 may include 10-11 symbols. In some instances, the length of the time period 802 for the PSCCH communication 820 may be predetermined. The first UE may transmit SCI in the PSCCH communication 820 during the time period 802 to the second UE, and the second UE may perform blind decoding in the time period 802 to receive the SCI.

While the PSSCH communication 810 and the PSCCH communication 820 are communicated during different time periods, each PSSCH communication 810, the PSCCH communication 820 may include an interlaced waveform. In some aspects, the transmission of the PSSCH communication 810 and the PSCCH communication 820 may use a DFT-s-OFDM waveform over the frequency interlace $608_{I(0)}$. In this regard, the first UE and/or the second UE may generate a DFT-s-OFDM transmission signal for transmission during the time period 802 by performing a DFT on the encode PSSCH control information, mapping the DFT output onto subcarriers (e.g., the subcarriers 612) of the RBs in the frequency interlace $608_{I(0)}$, and performing an IFFT. Similarly, the first UE and/or the second UE may generate a DFT-s-OFDM transmission signal for transmission during the time period 804 by performing a DFT on the encode PSSCH data, mapping the DFT output onto subcarriers of the RBs in the frequency interlace $608_{I(0)}$, and performing an IFFT. The DFT-s-OFDM based waveform transmission in the scheme 800 may provide a lower peak-to-average-power-ratio (PAPR) than the CP-OFDM based waveform transmission in the scheme 700.

Figure 9A:
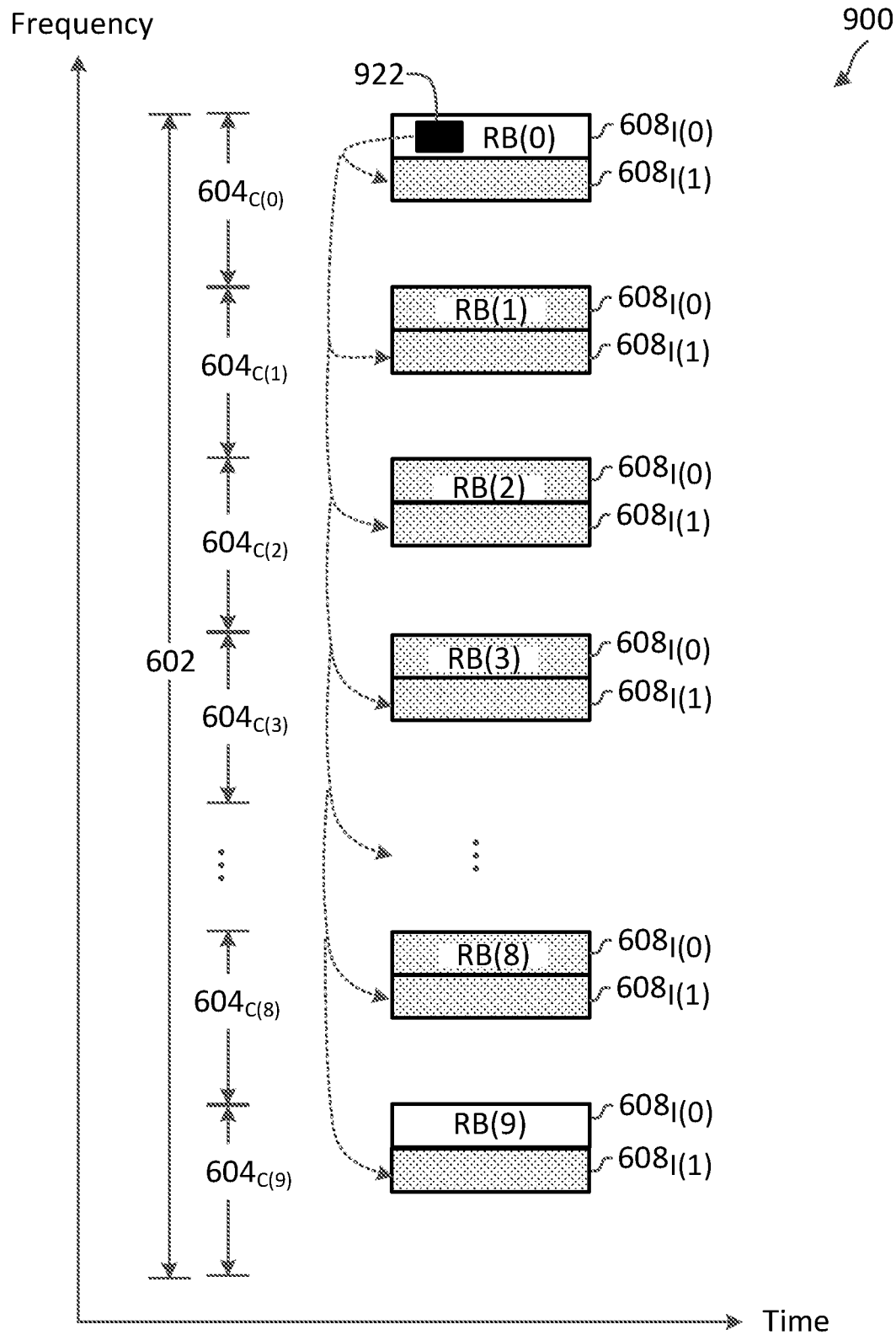
FIG. 9A illustrates a sidelink communication scheme using a frequency-interlaced waveform according to some aspects of the present disclosure.
Figure 9B:
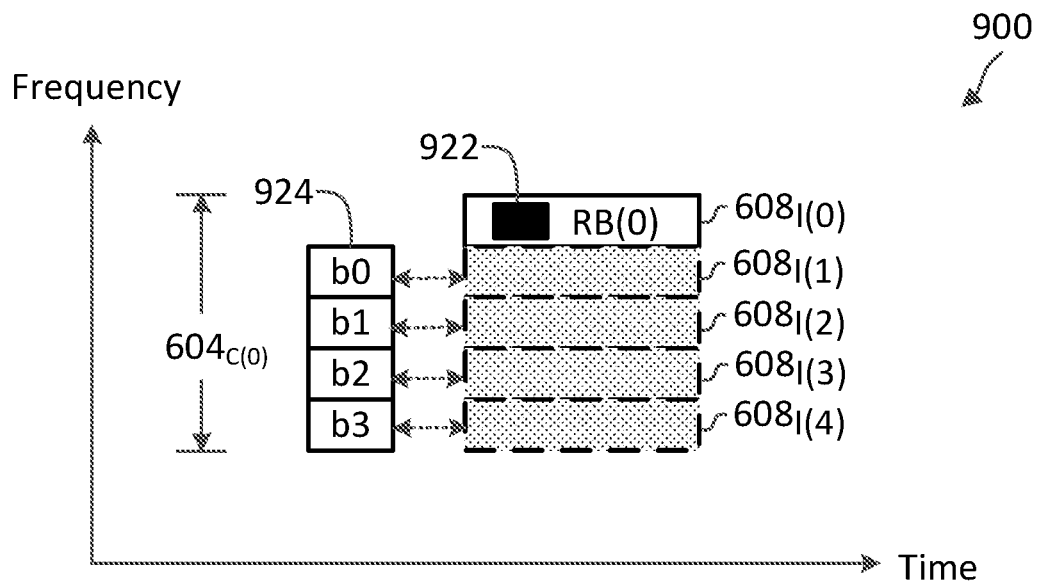
FIG. 9B illustrates a sidelink communication scheme using a frequency-interlaced waveform according to some aspects of the present disclosure.
Figure 9C:
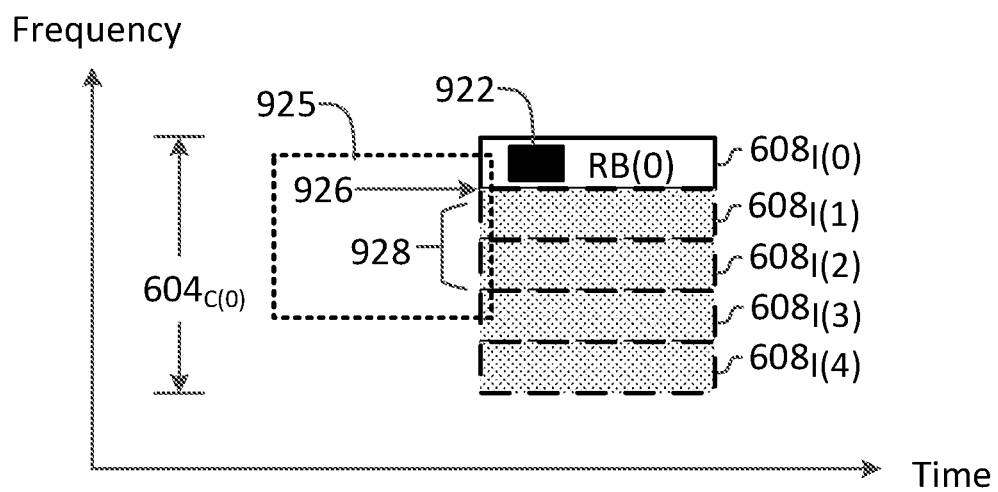
FIG. 9C illustrates a sidelink communication scheme using a frequency-interlaced waveform according to some aspects of the present disclosure.
Figure 10:
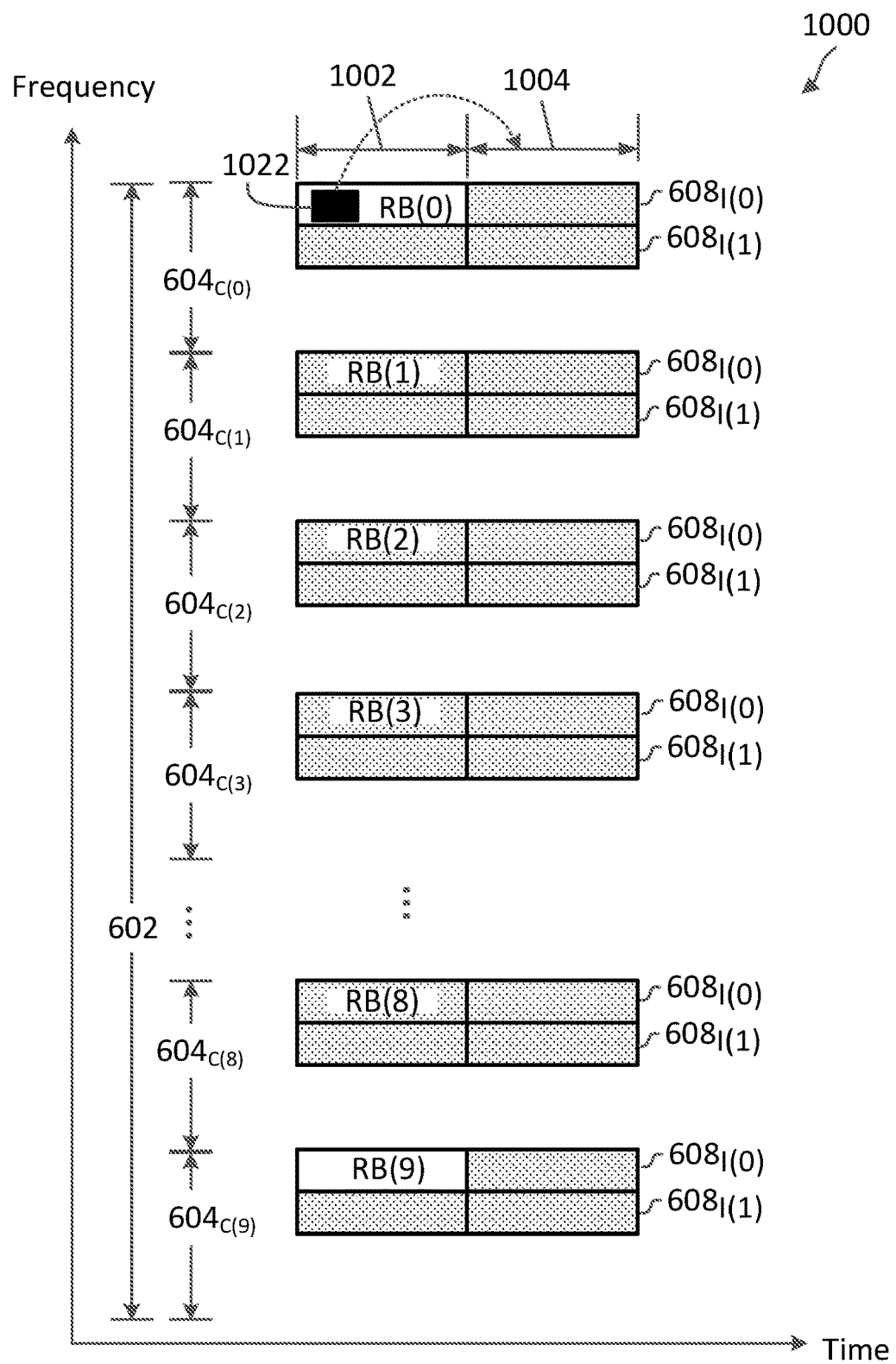
FIG. 10 illustrates a sidelink communication scheme using a frequency-interlaced waveform according to some aspects of the present disclosure.

In some aspects, one frequency interlace 608 may not be sufficient for carrying PSSCH data for sidelink communications. FIGS. 9A-9C and 10 illustrate various mechanisms for assigning additional frequency resources (e.g., frequency interlaces 608) and/or addition time resources (e.g., multiple slots and/or mini-slots) for sidelink communication (e.g., the PSSCH communications 310, 710, and/or 810 and the PSCCH communications 320, 720, and/or 820). In FIGS. 9 and 10, the schemes 900 and 1000 may be employed by a BS such as the BSs 105, 205, and/or 500 and a UE such as the UEs 115, 215, and/or 400 in a network such as the networks 100 and/or 200. In particular, the BS may configure the UE with multiple frequency interlaces over one or more transmission slots and/or one or more mini-slots for sidelink communication. Additionally, FIGS. 9A-9C and 10 are described using a similar frequency-interlaced resource structure as in the scheme 600, and may use the same reference numerals as in FIG. 6 for simplicity sake.

FIGS. 9A-9C collectively illustrate a sidelink communication scheme 900 using a frequency-interlaced waveform according to some aspects of the present disclosure. The scheme 900 is substantially similar to the scheme 700, where PSSCH communication 910 and PSCCH communication 920 are frequency-multiplexed onto the same frequency interlace $608_{I(0)}$. The PSSCH communication 910 is similar to the PSSCH communications 310, 710, and/or 810. The PSCCH communication 920 is similar to the PSCCH communications 320, 720, and/or 820. However, the scheme 900 may assign one or more additional frequency interlaces for the PSSCH communication 910. For purposes of simplicity of discussion, FIG. 9A illustrates an assignment of one additional frequency interlace $608_{I(1)}$ for the PSSCH communication 910, though it will be recognized that the scheme 900 may be applied to assign any suitable number of additional frequency interlaces 608 for the PSSCH communication 910 (e.g., about 2, 3, 4, or more).

In some aspects, a BS (e.g., the BSs 105, 205, and/or 500) may configure a first UE (e.g., the UEs 115, 215, and/or 400) with the frequency interlace $608_{I(0)}$ for communicating the PSSCH communication 910 and the PSCCH communication 920 with a second UE. Similar to the scheme 700, the BS may configure the highest-frequency RB(0) and the lowest-frequency RB(9) of the frequency interlace $608_{I(0)}$ for the PSCCH communication 920 and the remaining RBs in the frequency interlace $608_{I(0)}$ for the PSSCH communication 910. The first UE may assign an additional frequency interlace 608 for the PSSCH communication 910, for example, based on a transmission data size. The first UE may indicate the assignment of the additional frequency interlace 608 in the PSCCH communication 920. For example, in the illustrated example of FIG. 9, the first UE assigns an additional frequency interlace $608_{I(1)}$ for the PSSCH communication 910. While the example of FIG. 9 illustrates the additional frequency interlace to be adjacent or contiguous to the frequency interlace $608_{I(0)}$, the first UE may assign any other frequency interlace in the frequency band 602 for the PSSCH communication 910. For example, when the frequency band 602 includes M number of interlaces, $608I_{(0)}$ to $608I_{(M-1)}$, the first UE may assign a frequency interlace $608_{I(m)}$ as additional frequency domain resources for the PSSCH communication 910, where m may be between 1 to M-1.

In some aspects, the first UE may include in the transmission of the PSCCH communication 920, SCI 922 to indicate to the second UE that the PSSCH communication 910 is further transmitted in the additional frequency interlace $608_{I(1)}$ as shown by the dotted arrows. The first UE may transmit the SCI 922 in the highest-frequency RB(0) and may repeat the transmission of the SCI 922 in the lowest-frequency RB(9) of the frequency interlace $608_{I(0)}$. Thus, the second UE may decode the SCI 922 from the PSCCH communication 920 and receive the PSSCH communication 910 from the frequency interlace $608_{I(1)}$ in addition to the RB(1) to RB(8) of the frequency interlace $608_{I(1)}$. The SCI 922 may indicate resource allocation (RA) information for additional frequency interlaces 608 assigned for the PSSCH communication 910 using a bitmap (e.g., the bitmap 924 shown in FIG. 9B) or a resource indication value (MV) (e.g., the RIV 925 shown in FIG. 9C).

FIG. 9B illustrates one example of how the SCI 922 may indicate the assignment of an additional frequency interlace 608 for the PSSCH communication 910. In the illustrated example of FIG. 9B, the SCI 922 includes a bitmap 924 including a plurality of bits. For simplicity of illustration and discussion, FIG. 9B shows the first cluster $604_{C(0)}$ and the remaining clusters $604_{C(1)}$ to $604_{C(9)}$ are not shown. The length of the bitmap 924 may vary depending on the number of frequency interlaces 602 in the frequency band 602. Each bit in the bitmap may identify one of the frequency interlaces 602 in frequency band 602. For instance, the frequency band 602 may include five frequency interlaces 608 represented by $608_{I(0)}$, $608_{I(1)}$, $608_{I(2)}$, $608_{I(3)}$, and $608_{I(4)}$. The bitmap 924 may utilize four bits represented by [b0, b1, b2, b3] to indicate additional frequency interlaces 608 that may be assigned for the PSSCH communication 910 as shown by the dashed boxes. Each bit in the bitmap 924 may be set to a value of 1 to indicate that a corresponding frequency interlace 608 is assigned for the PSSCH communication 910. For instance, the bit b0 may be set to a value of 1 to indicate that the frequency interlace $608_{I(1)}$ is assigned for the PSSCH communication 910, the bit b1 may be set of a value of 1 to indicate that the frequency interlace $608_{I(2)}$ is assigned for the PSSCH communication 910, and so on. Conversely, a bit in the bitmap 924 may be set to a value of 0 to indicate that a corresponding frequency interlace 608 is not assigned for the PSSCH communication 910. In some other instances, a bit value of 0 in the bitmap 924 may indicate a corresponding frequency interlace 608 is assigned for the PSSCH communication 910 and a bit value of 0 in the bitmap 924 may indicate a corresponding frequency interlace 608 is not assigned for the PSSCH communication 910.

FIG. 9C illustrates another example of how the SCI 922 may indicate the assignment of an additional frequency interlace 608 for the PSSCH communication 910. In the illustrated example of FIG. 9C, the SCI 922 may include a RIV 925 including a first parameter 926 indicating a starting frequency interlace 608 and a second parameter 928 indicating a number of frequency interlace starting from the starting frequency interlace 608 that can be further used to communicate the PSSCH communication 910. For simplicity of illustration and discussion, FIG. 9C illustrates the assignment of two additional frequency interlaces 608 beginning at the frequency interlace $608_{I(1)}$. Thus, the first parameter 926 may include a value of 1 identifying the starting frequency interlace $608_{I(1)}$ and the second parameter 928 may include a value 2 indicating that two additional frequency interlaces 608 (e.g., the frequency interlaces $608_{I(1)}$ and $608_{I(2)}$) are assigned for the PSSCH communication 910.

In some aspects, the sidelink communication can be performed in a wideband, for example, having a BW of about 100 MHz. The wideband may be partitioned into multiple subbands similar to the frequency band 602, for example, with a 20 MHz BW. To facilitate sidelink communications the PSCCH communication 920 may be communicate in a frequency interlace 608 within a certain subband in the frequency band 602 and the first UE may assign an additional frequency interlace 608 in a different subband. The first UE may further indicate in the SCI 922 which subband of the multiple subbands the additional frequency interlace 608 is located.

FIG. 10 illustrates a sidelink communication scheme 1000 using a frequency-interlaced waveform according to some aspects of the present disclosure. The scheme 1000 is substantially similar to the scheme 900, where PSSCH communication 1010 and PSCCH communication 1020 are frequency-multiplexed onto the same frequency interlace $608_{I(0)}$ and an additional frequency interlace $608_{I(1)}$ is assigned for the PSCCH communication 1020. The PSSCH communication 1010 is similar to the PSSCH communications 310, 710, 810, and/or 910. The PSCCH communication 1020 is similar to the PSCCH communications 320, 720, 820, and/or 920. However, the scheme 1000 may further assign additional time resources (e.g., an aggregation of time slots) for the PSSCH communication 910. For purposes of simplicity of discussion, FIG. 10 illustrates an assignment of one additional time slot 1004 for the PSSCH communication 1010, though it will be recognized that the scheme 1000 may be applied to assign any suitable number of time slots for the PSSCH communication 1010 (e.g., about 2, 3, 4, or more).

In some aspects, a BS (e.g., the BSs 105, 205, and/or 500) may configure a first UE (e.g., the UEs 115, 215, and/or 400) with the frequency interlace $608_{I(0)}$ in a time slot 1002 for communicating the PSSCH communication 1010 and the PSCCH communication 1020 with a second UE. Similar to the schemes 700 and 900, the BS may configure the highest-frequency RB(0) and the lowest-frequency RB(9) of the frequency interlace $608_{I(0)}$ for the PSCCH communication 1020 and the remaining RBs in the frequency interlace $608_{I(0)}$ for the PSSCH communication 1010. Similar to the scheme 900, the first UE may assign an additional frequency interlace (e.g., the frequency interlace $608_{I(1)}$ for the PSSCH communication 1010 in the time slot 1002. The first UE may further assign an additional time slot 1004 for the PSSCH communication 1010. The first UE may indicate the assignment of the additional frequency interlace $608_{I(1)}$ and the additional time slot 1004 in the PSCCH communication 1020. The time slots 1002 and 1004 may include any suitable number of duration or OFDM symbols (e.g., about 2, 3, 4, 5, 6, 7, or more symbols 606).

In some aspects, similar to the scheme 900, the first UE may include in the transmission of the PSCCH communication 1020, SCI 1022 to indicate to the second UE that the PSCCH communication 1020 is further transmitted in the frequency interlace $608_{I(1)}$ during the time slot 1002 and in the frequency interlaces $608_{I(0)}$ and frequency interlace $608_{I(1)}$ during the time slot 1004. The indication of the additional time slot 1004 is shown by the dotted arrow. The first UE may transmit the SCI 1022 in the highest-frequency RB(0) and may repeat the transmission of the SCI 1022 in the lowest-frequency RB(9) of the frequency interlace $608_{I(0)}$. Thus, the second UE may decode the SCI 1022 from the PSCCH communication 1020 and receive the PSSCH communication 1010 from the frequency interlace $608_{I(1)}$ in addition to the RB(1) to RB(8) of the frequency interlace $608_{I(1)}$ during the time slot 1002 and from the frequency interlaces $608_{I(0)}$ and $608_{I(1)}$ during the time slot 1004. The SCI 1022 may indicate RA information for additional frequency interlaces 608 assigned for the PSSCH communication 1010 using similar mechanisms (e.g., the bitmap 924 and/or the RIV 925) as discussed in the scheme 900 discussed above with respect to FIG. 9. The SCI 1022 may further include a time length parameter in the SCI 1022 indicating the additional time slot 1004 assigned for the PSSCH communication 1010.

Figure 11:
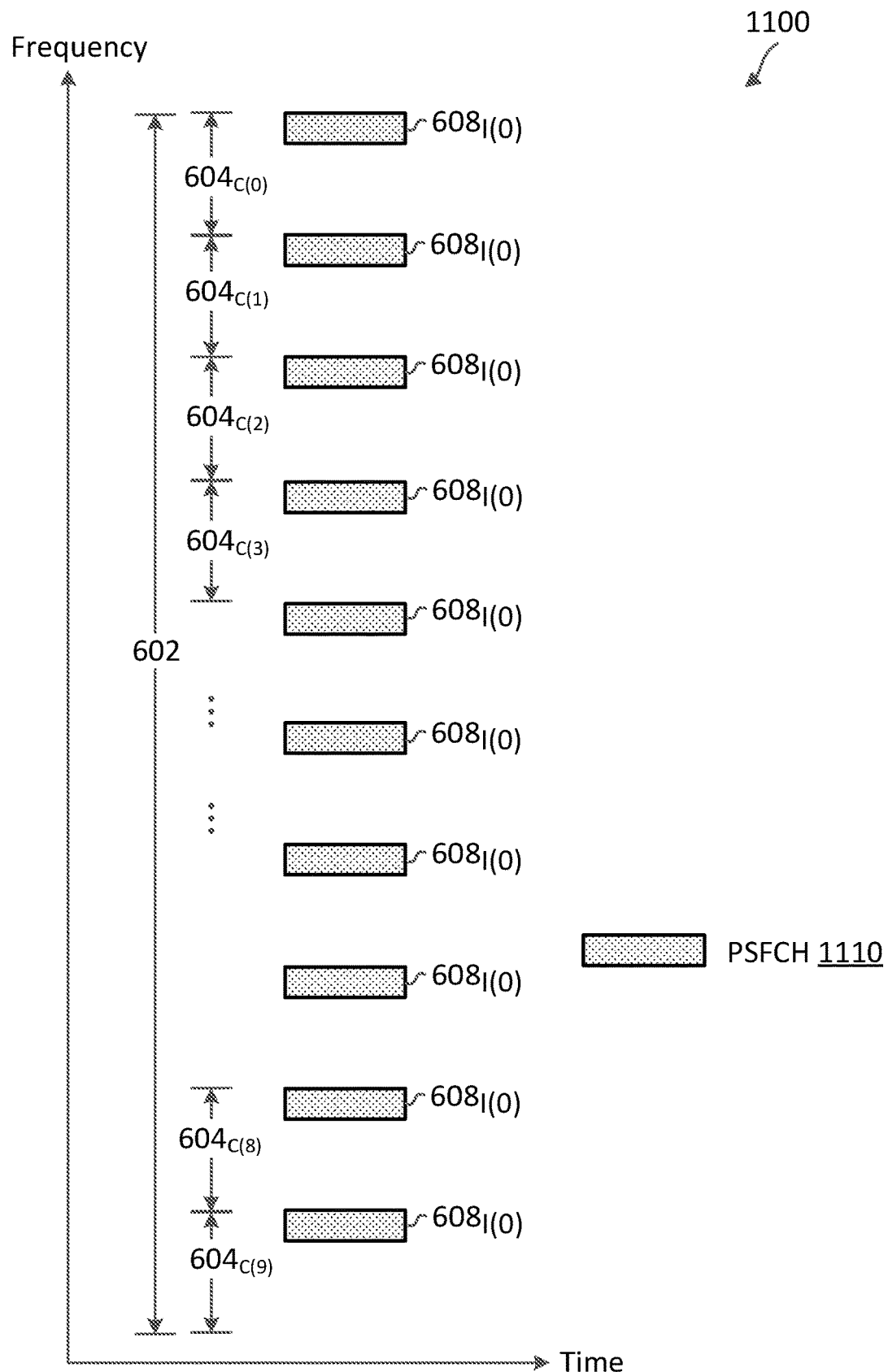
FIG. 11 illustrates a sidelink communication scheme using a frequency-interlaced waveform according to some aspects of the present disclosure.

FIG. 11 illustrates a sidelink communication scheme 1100 using a frequency-interlaced waveform according to some aspects of the present disclosure. The scheme 1100 may be employed by a BS such as the BSs 105, 205, and/or 500 and a UE such as the UEs 115, 215, and/or 400 in a network such as the networks 100 and/or 200. In particular, the BS may configure the UE with a frequency interlace for feedback communication over a sidelink (e.g., the sidelinks 251 and 252). The scheme 1100 may be employed in conjunction with the schemes 600, 700, 800, 900, and/or 1000 described above with respect to FIGS., 6, 7, 8, 9A-9C, and/or 10, respectively. In FIG. 11, the x-axis may represent time in some arbitrary units, and the y-axis may represent frequency in some arbitrary units. FIG. 11 is described using a similar frequency-interlaced resource structure as in the scheme 600, and may use the same reference numerals as in FIG. 6 for simplicity sake. T In some aspects, a BS (e.g., the BSs 105, 205, and/or 500) may configure a first UE (e.g., the UEs 115, 215, and/or 400)

with the frequency interlace $608_{I(0)}$ for physical sidelink feedback (PSFCH) communication 1110 with a second UE. In some aspects, the PSFCH communication 1110 may span about one OFDM symbol (e.g., the symbol 606). In some other aspects, the PSFCH communication 1110 may span more than one OFDM symbol.

In some aspects, the PSFCH communication 1110 may carry HARQ ACK/NACK feedbacks. As described above, HARQ techniques may be applied to improve communication reliability. In this regard, the first UE and the second UE may communicate PSSCH data (e.g., the PSSCH communications 710, 810, 910, and/or 1010) using HARQ and communicate HARQ ACK/NACK feedback using the assigned frequency interlace $608_{I(0)}$. For instance, the first UE may transmit PSSCH data to the second UE over a sidelink. The PSSCH data packet may be transmitted in the form of a TB. If the second UE receives PSSCH data successfully, the second UE may transmit a HARQ ACK (in the PSFCH communication 1110) to the first UE using the frequency interlace $608_{I(0)}$. Conversely, if the second UE fails to receive the PSSCH data successfully, the second UE 1 may transmit a HARQ NACK (in the PSFCH communication 1110) to the first UE using the frequency interlace $608_{I(0)}$. Upon receiving a HARQ NACK from the second UE, the first UE may retransmit the PSSCH data. Similarly, the second UE may transmit PSSCH data to the first UE using similar HARQ mechanisms. In some aspects, the HARQ ACK/NACK transmission may use one waveform sequence to indicate an ACK and another waveform sequence to indicate a NACK.

In some aspects, the PSFCH communication 1100 may carry channel state information (CSI) measurement reports. In this regard, the first UE may transmit a reference signal (e.g., a CSI reference signal) to the second UE over the sidelink and the second UE may provide the first UE with a CSI report based on measurements of the reference signal. Similarly, the second UE may transmit a CSI reference signal to the first UE over the sidelink and the first UE may provide the second UE with a CSI report based on measurements of the CSI reference signal.

Figure 12:
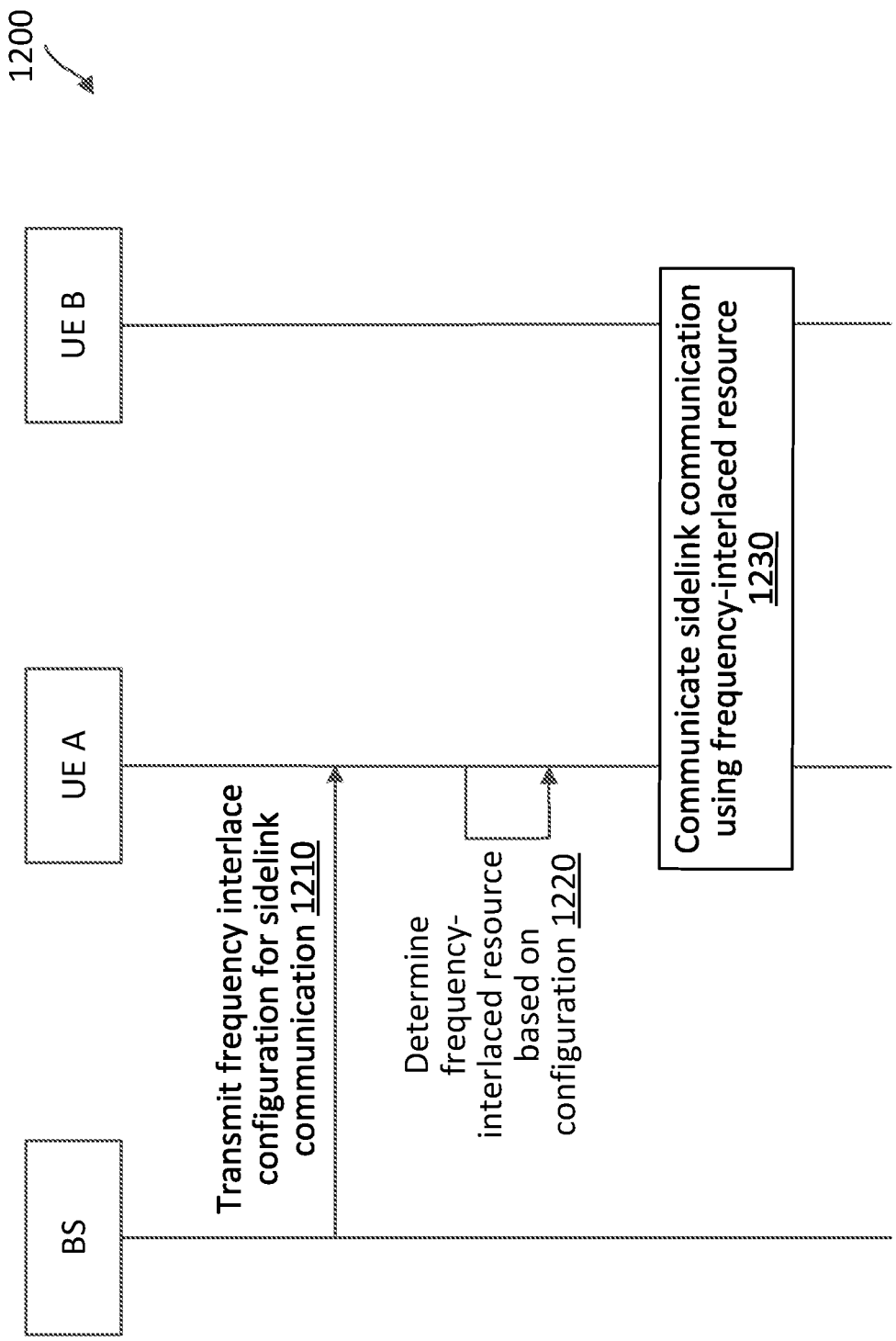
FIG. 12 is a signaling diagram of a sidelink communication method according to some aspects of the present disclosure.

FIG. 12 is a signaling diagram of a sidelink communication method 1200 according to some aspects of the present disclosure. The method 1200 may be implemented between a BS (e.g., BSs 105, 205, and/or 500) and two UEs (e.g., UEs 115, 215, and/or 400) shown as a UE A and a UE B. The method 1200 may employ similar mechanisms as in the schemes 600, 700, 800, 900, 1000, and/or 1100 described above with respect to FIGS. 6, 7, 8, 9A-9C, 10, and/or 11, respectively. As illustrated, the method 1200 includes a number of enumerated steps, but embodiments of the method 1200 may include additional steps before, after, and in between the enumerated steps. In some aspects, one or more of the enumerated steps may be omitted or performed in a different order.

At step 1210, the BS transmits a frequency interlace configuration for sidelink communication between the UE A and the UE B. The sidelink communications may include PSSCH communication (e.g., PSSCH communications 710, 810, 910, and/or 1010), PSCCH communication (e.g., the PSCCH communications 720, 820, 920, and/or 1020), and/or PSFCH communication (e.g., the PSFCH communication 1110). The configuration may indicate a pool of frequency interlace resources (e.g., the frequency interlaces 608) in a frequency band (e.g., the frequency band 602). The configuration may further indicate a multiplexing configuration for multiplexing PSSCH and PSCCH communication on the same frequency interlace. The multiplexing configuration may indicate a FDM as shown in the scheme 700 or a TDM as shown in the scheme 800. The configuration may further indicate a waveform type for the PSSCH and PSCCH communication. When the multiplexing is FDM, the waveform type may be a CP-OFDM waveform. When the multiplexing is TDM, the waveform type may be a CP-OFDM waveform or a DFT-s-OFDM waveform. The configuration may further indicate a particular frequency interlace for multiplexing PSSCH and PSCCH communications. The configuration may further indicate that the UE A and/or the UE B may select additional frequency interlace resources from the resource pool for sidelink communication.

At step 1220, upon receiving the frequency interlace configuration, the UE A determines a first frequency interlace (e.g., the frequency interlace 6081(0)) for sidelink communication based on the configuration. In some aspects, the first frequency interlace may correspond to the frequency interlaced configured by the BS for multiplexing PSSCH and PSCCH communication.

At step 1230, the UE A may communicate PSSCH data and/or PSCCH control information using the first frequency interlace. The UE A may perform an LBT in the frequency band prior to transmitting the PSSCH data and/or the PSCCH control information. The UE A may multiplex the PSSCH data and/or the PSCCH control information according the multiplexing configuration on the first frequency interlace. The UE A may assign additional frequency domain resource (e.g., one or more frequency interlace 608) and/or time domain resource for communicating the PSSCH data using mechanisms described in the schemes 900 and/or 1000 described above. In some aspects, the UE A may select the additional frequency domain resource and/or the time domain resource from the resource pool.

Figure 13:
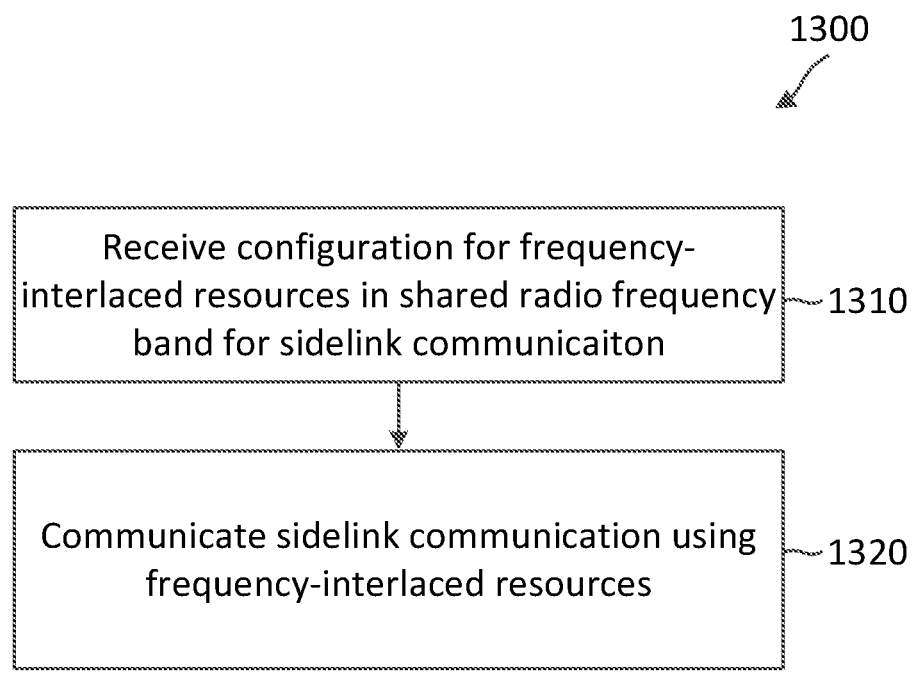
FIG. 13 is a flow diagram of a communication method according to some aspects of the present disclosure.

FIG. 13 is a flow diagram of a communication method 1300 according to some aspects of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115, 215, or the UE 400, may utilize one or more components, such as the processor 402, the memory 404, the sidelink communication module 408, the transceiver 410, the modem 412, and the one or more antennas 416, to execute the steps of method 1300. The method 1300 may employ similar mechanisms as in the schemes 600, 700, 800, 900, 1000, and/or 1100 described above with respect to FIGS. 6, 7, 8, 9A-C, 10, and/or 11, respectively, and/or the method 1200 described above with respect to FIG. 12. As illustrated, the method 1300 includes a number of enumerated steps, but aspects of the method 1300 may include additional steps before, after, and in between the enumerated steps. In some aspects, one or more of the enumerated steps may be omitted or performed in a different order.

At step 1310, the method 1300 includes receiving, by a first UE from a BS (e.g., the BSs 105, 205, and/or 500), a configuration for frequency-interlaced resources (e.g., the frequency interlaces 608) in a shared radio frequency band for sidelink communication between the first UE and a second UE. In some instances, the first UE may correspond to the UE 400 and may utilize one or more components, such as the sidelink communication module 408, the transceiver 410, the modem 412, and the one or more antennas 416, to receive the configuration for the frequency-interlaced resource in the shared radio frequency band for sidelink communication between the first UE and the second UE.

At step 1320, the method 1300 includes communicating, by the first UE with the second UE, the sidelink communication using the frequency-interlaced resources. In some instances, the first UE may correspond to the UE 400 and may utilize one or more components, such as the sidelink communication module 408, the transceiver 410, the modem 412, and the one or more antennas 416, to communicate the sidelink communication with the second UE using the frequency-interlaced resources.

In some aspects, the step 1320 includes communicating, by the first UE with the second UE, the sidelink communication by frequency-multiplexing a PSCCH signal (e.g., the PSCCH communication 720, 820, 920, and/or 1020) and a PSSCH signal (e.g., the PSSCH communication 710, 810, 910, and/or 1010) on the frequency-interlaced resources based on the configuration.

In some aspects, the frequency-interlaced resources include a first frequency interlace of RBs (e.g., the RBs 610) uniformly spaced in the shared radio frequency band. The step 1320 includes communicating, by the first UE with the second UE, the PSCCH signal in at least one of a highest-frequency RB or a lowest-frequency RB among the first frequency interlace based on the configuration. The step 1320 further includes communicating, by the first UE with the second UE, the PSSCH signal in all remaining RBs in the first frequency interlace based on the configuration. In some aspects, the step 1320 includes communicating, by the first UE with the second UE, the PSSCH signal further in at least a second frequency interlace of PRBs uniformly spaced in the shared radio frequency band. In some aspects, the step 1320 includes communicating, by the first UE and the second UE, the PSCCH signal including SCI (e.g., the SCI 922) indicating an assignment of the second frequency interlace for communicating the PSSCH signal. In some aspects, the SCI includes a bitmap (e.g., the bitmap 924) including a plurality of bits, each bit of the plurality of bits identifying a frequency interlace in the shared radio frequency band, and wherein a first bit of the plurality of bits identifies the second frequency interlace. In some aspects, the SCI includes a RIV (e.g., the RIV 925) indicating a starting frequency interlace and a number of one or more frequency interlaces for communicating the PSSCH signal, where the starting frequency interlace corresponds to the starting frequency interlace. In some aspects, the shared radio frequency band includes a plurality of subbands. The step 1320 includes communicating, by the first UE and the second UE, the PSCCH signal including SCI indicating which subbands of the plurality of subbands the second frequency interlace is located. In some aspects, the first UE further selects the second frequency interlace for communicating the PSSCH signal from the frequency-interlaced resources. In some instances, the first UE may correspond to the UE 400 and may store the information associated with the frequency-interlaced resources in the memory 404 and utilize one or more components, such as the sidelink communication module 408 and the processor 410 to select the second frequency interlace for communicating the PSSCH signal based on the information of the frequency-interlaced resources stored in the memory 404.

In some aspects, the step 1320 includes communicating, by the first UE with the second UE, the PSSCH signal and the PSCCH signal in the first frequency interlace during a first time period (e.g., the time slot 1002) based on the configuration, the PSCCH signal including SCI including an indication of a second time period (e.g., the time slot 1004) for communicating the PSSCH signal. The step 1320 further includes communicating, by the first UE with the second UE, the PSSCH signal further in the first frequency interlace during the second time period based on the SCI. In some aspects, the first UE further selects the first frequency interlace in the second time period for communicating the PSSCH signal from the frequency-interlaced resources. In some instances, the first UE may correspond to the UE 400 and may store the information associated with the frequency-interlaced resources in the memory 404 and utilize one or more components, such as the sidelink communication module 408 and the processor 410 to select the second frequency interlace for communicating the PSSCH signal based on the information of the frequency-interlaced resources stored in the memory 404.

In some aspects, the step 1320 includes communicating, by the first UE with the second UE, the sidelink communication by time-multiplexing a PSCCH signal and a PSSCH signal on the frequency-interlaced resources based on the configuration.

In some aspects, the step 1320 is performed based on a successful LBT in the shared radio frequency band.

Figure 14:
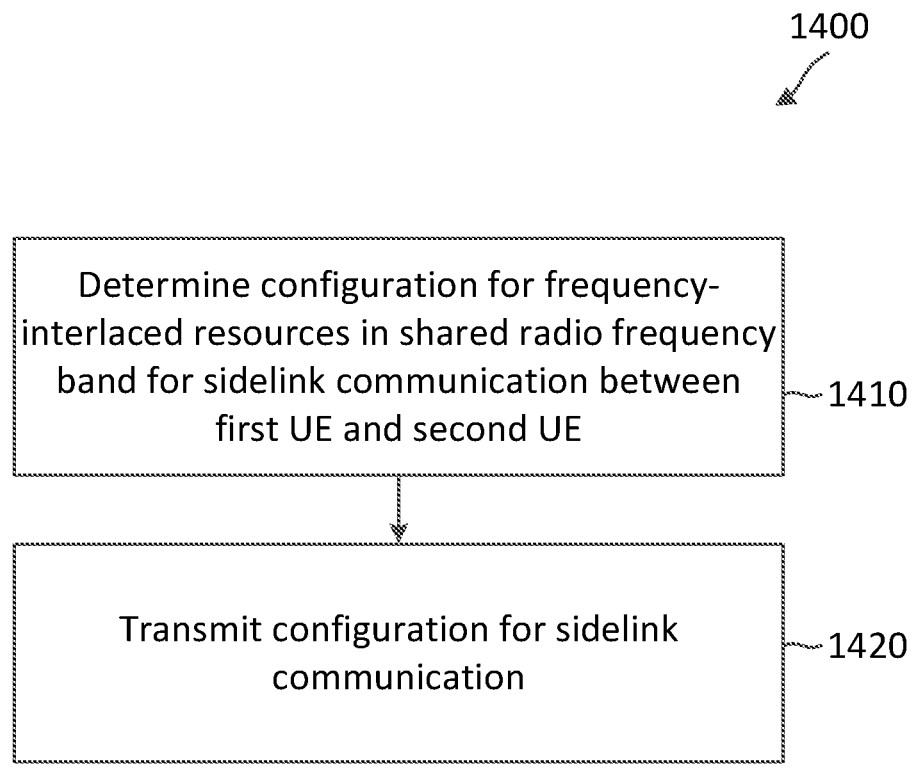
FIG. 14 is a flow diagram of a communication method according to some aspects of the present disclosure.

FIG. 14 is a flow diagram of a communication method 1400 according to some aspects of the present disclosure. Steps of the method 1400 can be executed by a computing device (e.g., a processor, processing circuit, and/or other suitable component) of a wireless communication device or other suitable means for performing the steps. For example, a wireless communication device, such as the BS 105, the BS 205, or the BS 500, may utilize one or more components, such as the processor 502, the memory 504, the sidelink communication module 508, the transceiver 510, the modem 512, and the one or more antennas 516, to execute the steps of method 1400. The method 1400 may employ similar mechanisms as in the schemes 600, 700, 800, 900, 1000, and/or 1100 described above with respect to FIGS. 6, 7, 8, 9A-C, 10, and/or 11, respectively, and/or the method 1200 described above with respect to FIG. 12. As illustrated, the method 1400 includes a number of enumerated steps, but aspects of the method 1400 may include additional steps before, after, and in between the enumerated steps. In some aspects, one or more of the enumerated steps may be omitted or performed in a different order.

At step 1410, the method 1400 includes determining, by a BS, a configuration for frequency-interlaced resources in a shared radio frequency band for sidelink communication between a first UE (e.g., the UEs 115, 215, and/or 400) and a second UE (e.g., the UEs 115, 215, and/or 400). In some instances, the BS may correspond to the BS 500 and may utilize one or more components, such as the sidelink communication module 408 and the processor 410 to determine the configuration for the frequency-interlaced resources in the shared radio frequency band for the sidelink communication between the first UE and the second UE.

At step 1420, the method 1400 includes transmitting, by the BS to the first UE, the configuration for the sidelink communication. In some instances, the BS may correspond to the BS 500 and may utilize one or more components, such as the sidelink communication module 508, the transceiver 510, the modem 512, and the one or more antennas 516, to transmit, to the first UE, the configuration for the sidelink communication.

In some aspects, the step 1410 includes determining, by the BS, a frequency interlace (e.g., the frequency interlaces 608) of RBs (e.g., the RBs 610) uniformly spaced in the shared radio frequency band. In some aspects, the configuration includes a multiplex configuration for frequency-multiplexing a PSCCH communication (e.g., the PSCCH communication 720, 820, 920, and/or 1020) and a PSSCH communication (e.g., the PSSCH communication 710, 810, 910, and/or 1010) on the frequency interlace. In some aspects, the configuration indicates a highest-frequency RB and a lowest-frequency RB among the frequency interlace of RBs for the PSCCH communication. In some aspects, the configuration includes a multiplex configuration for time-multiplexing a PSCCH communication and a PSSCH communication on the frequency interlace.

Further embodiments of the present disclosure include a method of wireless communication. The method of wireless communication includes receiving, by a first user equipment (UE) from a base station (BS), a configuration for frequency-interlaced resources in a shared radio frequency band for sidelink communication between the first UE and a second UE. The method of wireless communication also includes communicating, by the first UE with the second UE, the sidelink communication using the frequency-interlaced resources.

The method may also include one or more of the following features. For instance, the method includes where the communicating includes communicating, by the first UE with the second UE, the sidelink communication by frequency-multiplexing a physical sidelink control channel (PSCCH) signal and a physical sidelink shared channel (PSSCH) signal on the frequency-interlaced resources based on the configuration. The frequency-interlaced resources include a first frequency interlace of resource blocks (RBs) uniformly spaced in the shared radio frequency band, and where the communicating includes communicating, by the first UE with the second UE, the PSCCH signal in at least one of a highest-frequency RB or a lowest-frequency RB among the first frequency interlace based on the configuration; and communicating, by the first UE with the second UE, the PSSCH signal in all remaining RBs in the first frequency interlace based on the configuration. The communicating includes communicating, by the first UE with the second UE, the PSSCH signal further in at least a second frequency interlace of RBs uniformly spaced in the shared radio frequency band. The communicating includes communicating, by the first UE and the second UE, the PSCCH signal including sidelink control information (SCI) indicating an assignment of the second frequency interlace for communicating the PSSCH signal. The SCI includes a bitmap including a plurality of bits, each bit of the plurality of bits identifying a frequency interlace in the shared radio frequency band, and where a first bit of the plurality of bits identifies the second frequency interlace. The SCI indicates a starting frequency interlace and a number of one or more frequency interlaces for communicating the PSSCH signal, and where the starting frequency interlace corresponds to the starting frequency interlace. The shared radio frequency band includes a plurality of subbands, and where the communicating includes communicating, by the first UE and the second UE, the PSCCH signal including sidelink control information (SCI) indicating which subbands of the plurality of subbands the second frequency interlace is located. The method may include selecting, by the first UE, the second frequency interlace for communicating the PSSCH signal from the frequency-interlaced resources. The communicating includes communicating, by the first UE with the second UE, the PSSCH signal and the PSCCH signal in the first frequency interlace during a first time period based on the configuration, the PSCCH signal including sidelink control information (SCI) including an indication of a second time period for communicating the PSSCH signal; and communicating, by the first UE with the second UE, the PSSCH signal further in the first frequency interlace during the second time period based on the SCI. The method may include selecting, by the first UE, the first frequency interlace in the second time period for communicating the PSSCH signal from the frequency-interlaced resources. The communicating includes communicating, by the first UE with the second UE, the sidelink communication by time-multiplexing a physical sidelink control channel (PSCCH) signal and a physical sidelink shared channel (PSSCH) signal on the frequency-interlaced resources based on the configuration. The communicating is further based on a listen-before-talk (LBT) in the shared radio frequency band.

Further embodiments of the present disclosure include a method of wireless communication. The method of wireless communication includes determining, by a base station (BS), a configuration for frequency-interlaced resources in a shared radio frequency band for sidelink communication between a first user equipment (UE) and a second UE. The method of wireless communication also includes transmitting, by the BS to the first UE, the configuration for the sidelink communication.

The method may also include one or more of the following features. For instance, the method includes where the determining includes determining, by the BS, a frequency interlace of resource blocks (RBs) uniformly spaced in the shared radio frequency band. The configuration includes a multiplex configuration for frequency-multiplexing a physical sidelink control channel (PSCCH) communication and a physical sidelink shared channel (PSSCH) communication on the frequency interlace. The configuration indicates a highest-frequency RB and a lowest-frequency RB among the frequency interlace of RBs for the PSCCH communication. The configuration includes a multiplex configuration for time-multiplexing a physical sidelink control channel (PSCCH) communication and a physical sidelink shared channel (PSSCH) communication on the frequency interlace.

Further embodiments of the present disclosure include a first user equipment (UE) including a transceiver configured to receive, from a base station (BS), a configuration for frequency-interlaced resources in a shared radio frequency band for sidelink communication between the first UE and a second UE. The transceiver also configured to communicate, with the second UE, the sidelink communication using the frequency-interlaced resources.

The first UE may also include one or more of the following features. For instance, the first UE includes where the transceiver configured to communicate the sidelink communication is further configured to communicate, with the second UE, the sidelink communication by frequency-multiplexing a physical sidelink control channel (PSCCH) signal and a physical sidelink shared channel (PSSCH) signal on the frequency-interlaced resources based on the configuration. The frequency-interlaced resources include a first frequency interlace of resource blocks (RBs) uniformly spaced in the shared radio frequency band, and where the transceiver configured to communicate the sidelink communication is further configured to communicate, with the second UE, the PSCCH signal in at least one of a highest-frequency RB or a lowest-frequency RB among the first frequency interlace based on the configuration; and communicate, with the second UE, the PSSCH signal in all remaining RBs in the first frequency interlace based on the configuration. The transceiver configured to communicate the sidelink communication is further configured to communicate, with the second UE, the PSSCH signal further in at least a second frequency interlace of RBs uniformly spaced in the shared radio frequency band. The transceiver configured to communicate the sidelink communication is further configured to communicate, and the second UE, the PSCCH signal including sidelink control information (SCI) indicating an assignment of the second frequency interlace for communicating the PSSCH signal. The SCI includes a bitmap including a plurality of bits, each bit of the plurality of bits identifying a frequency interlace in the shared radio frequency band, and where a first bit of the plurality of bits identifies the second frequency interlace. The SCI indicates a starting frequency interlace and a number of one or more frequency interlaces for communicating the PSSCH signal, and where the starting frequency interlace corresponds to the starting frequency interlace. The shared radio frequency band includes a plurality of subbands, and where the transceiver configured to communicate the sidelink communication is further configured to communicate, and the second UE, the PSCCH signal including sidelink control information (SCI) indicating which subbands of the plurality of subbands the second frequency interlace is located. The first UE may include a processor configured to select the second frequency interlace for communicating the PSSCH signal from the frequency-interlaced resources. The transceiver configured to communicate the sidelink communication is further configured to communicate, with the second UE, the PSSCH signal and the PSCCH signal in the first frequency interlace during a first time period based on the configuration, the PSCCH signal including sidelink control information (SCI) including an indication of a second time period for communicating the PSSCH signal; and communicate, with the second UE, the PSSCH signal further in the first frequency interlace during the second time period based on the SCI. The first UE may include a processor configured to select the first frequency interlace in the second time period for communicating the PSSCH signal from the frequency-interlaced resources. The transceiver configured to communicate the sidelink communication is further configured to communicate, with the second UE, the sidelink communication by time-multiplexing a physical sidelink control channel (PSCCH) signal and a physical sidelink shared channel (PSSCH) signal on the frequency-interlaced resources based on the configuration. The transceiver configured to communicate the sidelink communication is further configured to communicate the sidelink communication based on a listen-before-talk (LBT) in the shared radio frequency band.

Further embodiments of the present disclosure include a base station (BS). The base station also includes a processor configured to determine a configuration for frequency-interlaced resources in a shared radio frequency band for sidelink communication between a first user equipment (UE) and a second UE. The base station also includes a transceiver configured to transmit, to the first UE, the configuration for the sidelink communication.

The BS may also include one or more of the following features. For instance, the BS includes where the processor configured to determine the configuration is further configured to determine a frequency interlace of resource blocks (RBs) uniformly spaced in the shared radio frequency band. The configuration includes a multiplex configuration for frequency-multiplexing a physical sidelink control channel (PSCCH) communication and a physical sidelink shared channel (PSSCH) communication on the frequency interlace. The configuration indicates a highest-frequency RB and a lowest-frequency RB among the frequency interlace of RBs for the PSCCH communication. The configuration includes a multiplex configuration for time-multiplexing a physical sidelink control channel (PSCCH) communication and a physical sidelink shared channel (PSSCH) communication on the frequency interlace.

Further embodiments of the present disclosure include a non-transitory computer-readable medium having program code recorded thereon. For instance, the non-transitory computer-readable medium includes code for causing a first user equipment (UE) to receive, from a base station (BS), a configuration for frequency-interlaced resources in a shared radio frequency band for sidelink communication between the first UE and a second UE. The non-transitory computer-readable medium also includes code for causing the first UE to communicate, with the second UE, the sidelink communication using the frequency-interlaced resources.

The non-transitory computer-readable medium may also include one or more of the following features. For instance, the non-transitory computer-readable medium includes where the code for causing the first UE to communicate the sidelink communication is further configured to communicate, with the second UE, the sidelink communication by frequency-multiplexing a physical sidelink control channel (PSCCH) signal and a physical sidelink shared channel (PSSCH) signal on the frequency-interlaced resources based on the configuration. The frequency-interlaced resources include a first frequency interlace of resource blocks (RBs) uniformly spaced in the shared radio frequency band, and where the code for causing the first UE to communicate the sidelink communication is further configured to communicate, with the second UE, the PSCCH signal in at least one of a highest-frequency RB or a lowest-frequency RB among the first frequency interlace based on the configuration; and communicate, with the second UE, the PSSCH signal in all remaining RBs in the first frequency interlace based on the configuration. The code for causing the first UE to communicate the sidelink communication is further configured to communicate, with the second UE, the PSSCH signal further in at least a second frequency interlace of RBs uniformly spaced in the shared radio frequency band. The code for causing the first UE to communicate the sidelink communication is further configured to communicate, and the second UE, the PSCCH signal including sidelink control information (SCI) indicating an assignment of the second frequency interlace for communicating the PSSCH signal. The SCI includes a bitmap including a plurality of bits, each bit of the plurality of bits identifying a frequency interlace in the shared radio frequency band, and where a first bit of the plurality of bits identifies the second frequency interlace. The SCI indicates a starting frequency interlace and a number of one or more frequency interlaces for communicating the PSSCH signal, and where the starting frequency interlace corresponds to the starting frequency interlace. The shared radio frequency band includes a plurality of subbands, and where the code for causing the first UE to communicate the sidelink communication is further configured to communicate, and the second UE, the PSCCH signal including sidelink control information (SCI) indicating which subbands of the plurality of subbands the second frequency interlace is located. The non-transitory computer-readable medium may include code for causing the first UE to select the second frequency interlace for communicating the PSSCH signal from the frequency-interlaced resources. The code for causing the first UE to communicate the sidelink communication is further configured to communicate, with the second UE, the PSSCH signal and the PSCCH signal in the first frequency interlace during a first time period based on the configuration, the PSCCH signal including sidelink control information (SCI) including an indication of a second time period for communicating the PSSCH signal; and communicate, with the second UE, the PSSCH signal further in the first frequency interlace during the second time period based on the SCI. The non-transitory computer-readable medium may include code for causing the first UE to select the first frequency interlace in the second time period for communicating the PSSCH signal from the frequency-interlaced resources. The code for causing the first UE to communicate the sidelink communication is further configured to communicate, with the second UE, the sidelink communication by time-multiplexing a physical sidelink control channel (PSCCH) signal and a physical sidelink shared channel (PSSCH) signal on the frequency-interlaced resources based on the configuration. The code for causing the first UE to communicate the sidelink communication is further configured to communicate the sidelink communication based on a listen-before-talk (LBT) in the shared radio frequency band.

Further embodiments of the present disclosure include a non-transitory computer-readable medium having program code recorded thereon. For instance, the non-transitory computer-readable medium includes code for causing a base station (BS) to determine a configuration for frequency-interlaced resources in a shared radio frequency band for sidelink communication between a first user equipment (UE) and a second UE. The non-transitory computer-readable medium also includes code for causing the BS to transmit, to the first UE, the configuration for the sidelink communication.

The non-transitory computer-readable medium may also include one or more of the following features. For instance, the non-transitory computer-readable medium includes where the code for causing the BS to determine the configuration is further configured to determine a frequency interlace of resource blocks (RBs) uniformly spaced in the shared radio frequency band. The configuration includes a multiplex configuration for frequency-multiplexing a physical sidelink control channel (PSCCH) communication and a physical sidelink shared channel (PSSCH) communication on the frequency interlace. The configuration indicates a highest-frequency RB and a lowest-frequency RB among the frequency interlace of RBs for the PSCCH communication. The configuration includes a multiplex configuration for time-multiplexing a physical sidelink control channel (PSCCH) communication and a physical sidelink shared channel (PSSCH) communication on the frequency interlace.

Further embodiments of the present disclosure include a first user equipment (UE). The first user equipment includes means for receiving, from a base station (BS), a configuration for frequency-interlaced resources in a shared radio frequency band for sidelink communication between the first UE and a second UE. The first user equipment also includes means for communicating, with the second UE, the sidelink communication using the frequency-interlaced resources.

The first UE may also include one or more of the following features. For instance, the first UE includes where the means for communicating the sidelink communication is further configured to communicating, with the second UE, the sidelink communication by frequency-multiplexing a physical sidelink control channel (PSCCH) signal and a physical sidelink shared channel (PSSCH) signal on the frequency-interlaced resources based on the configuration. The frequency-interlaced resources include a first frequency interlace of resource blocks (RBs) uniformly spaced in the shared radio frequency band, and where the means for communicating the sidelink communication is further configured to communicate, with the second UE, the PSCCH signal in at least one of a highest-frequency RB or a lowest-frequency RB among the first frequency interlace based on the configuration; and communicate, with the second UE, the PSSCH signal in all remaining RBs in the first frequency interlace based on the configuration. The means for communicating the sidelink communication is further configured to communicate, with the second UE, the PSSCH signal further in at least a second frequency interlace of RBs uniformly spaced in the shared radio frequency band. The means for communicating the sidelink communication is further configured to communicate, and the second UE, the PSCCH signal including sidelink control information (SCI) indicating an assignment of the second frequency interlace for communicating the PSSCH signal. The SCI includes a bitmap including a plurality of bits, each bit of the plurality of bits identifying a frequency interlace in the shared radio frequency band, and where a first bit of the plurality of bits identifies the second frequency interlace. The SCI indicates a starting frequency interlace and a number of one or more frequency interlaces for communicating the PSSCH signal, and where the starting frequency interlace corresponds to the starting frequency interlace. The shared radio frequency band includes a plurality of subbands, and where the means for communicating the sidelink communication is further configured to communicate, and the second UE, the PSCCH signal including sidelink control information (SCI) indicating which subbands of the plurality of subbands the second frequency interlace is located. The first UE may include means for selecting the second frequency interlace for communicating the PSSCH signal from the frequency-interlaced resources. The means for communicating the sidelink communication is further configured to communicate, with the second UE, the PSSCH signal and the PSCCH signal in the first frequency interlace during a first time period based on the configuration, the PSCCH signal including sidelink control information (SCI) including an indication of a second time period for communicating the PSSCH signal; and communicating, with the second UE, the PSSCH signal further in the first frequency interlace during the second time period based on the SCI. The first UE may include means for selecting the first frequency interlace in the second time period for communicating the PSSCH signal from the frequency-interlaced resources. The means for communicating the sidelink communication is further configured to communicate, with the second UE, the sidelink communication by time-multiplexing a physical sidelink control channel (PSCCH) signal and a physical sidelink shared channel (PSSCH) signal on the frequency-interlaced resources based on the configuration. The means for communicating the sidelink communication is further configured to communicate the sidelink communication based on a listen-before-talk (LBT) in the shared radio frequency band.

Further embodiments of the present disclosure include a base station (BS). The base station includes means for determining a configuration for frequency-interlaced resources in a shared radio frequency band for sidelink communication between a first user equipment (UE) and a second UE. The base station also includes means for transmitting, to the first UE, the configuration for the sidelink communication.

The BS may also include one or more of the following features. For instance, the BS includes where the means for determining the configuration is further configured to determine a frequency interlace of resource blocks (RBs) uniformly spaced in the shared radio frequency band. The configuration includes a multiplex configuration for frequency-multiplexing a physical sidelink control channel (PSCCH) communication and a physical sidelink shared channel (PSSCH) communication on the frequency interlace. The configuration indicates a highest-frequency RB and a lowest-frequency RB among the frequency interlace of RBs for the PSCCH communication. The configuration includes a multiplex configuration for time-multiplexing a physical sidelink control channel (PSCCH) communication and a physical sidelink shared channel (PSSCH) communication on the frequency interlace.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, at a first user equipment (UE), a configuration for frequency-interlaced resources in a shared radio frequency band for sidelink communication between the first UE and a second UE, wherein the configuration for the frequency-interlaced resources indicates a first interlace of resource blocks (RBs), wherein the shared radio frequency band includes a plurality of subbands wherein the RBs of the first interlace are uniformly spaced in the shared radio frequency band, and wherein the configuration indicates a first portion of resources including at least one of a highest-frequency RB or a lowest-frequency RB among the first interlace; and
   communicating, by the first UE with the second UE, a sidelink communication using the frequency-interlaced resources, wherein the communicating includes:
      frequency-multiplexing, based on the configuration, a physical sidelink control channel (PSCCH) signal and a first portion of a physical sidelink shared channel (PSSCH) signal in the first interlace in a first time period, wherein the PSCCH signal comprises sidelink control information (SCI) in the at least one of the highest-frequency RB or the lowest-frequency RB among the first interlace, the SCI indicating a second interlace of RBs different from the first interlace, the SCI further indicating which subbands of the plurality of subbands the second interlace is located; and
      communicating, based on the SCI, a second portion of the PSSCH signal in the second interlace of RBs.

2. The method of claim 1, wherein the communicating includes:
   communicating, by the first UE with the second UE, the PSSCH signal in one or more RBs different from the at least one of the highest-frequency RB or the lowest-frequency RB among the first interlace based on the configuration.

3. The method of claim 2, wherein the RBs of the second interlace are uniformly spaced in the shared radio frequency band.

4. The method of claim 3, wherein the SCI indicates an assignment of the second interlace for communicating the PSSCH signal.

5. The method of claim 4, wherein the SCI indicates a starting frequency interlace and a number of one or more frequency interlaces for communicating the PSSCH signal.

6. The method of claim 1, further comprising:
   selecting, by the first UE, the second interlace for communicating the PSSCH signal from the frequency-interlaced resources.

7. The method of claim 1, wherein the configuration indicates a first portion of resources including one or more first symbols of a plurality of RBs of the first interlace, and wherein the communicating includes:
   communicating, by the first UE with the second UE, the sidelink communication by time-multiplexing the PSCCH signal in the one or more first symbols and the PSSCH signal in one or more second symbols on the frequency-interlaced resources based on the configuration.

8. A method of wireless communication, comprising:
   receiving, at a first user equipment (UE), a configuration for frequency-interlaced resources in a shared radio frequency band for sidelink communication between the first UE and a second UE, wherein the frequency-interlaced resources include a first frequency interlace of resource blocks (RBs) uniformly spaced in the shared radio frequency band, wherein the frequency-interlaced resources includes at least one of a highest-frequency RB or a lowest-frequency RB among the first frequency interlace; and communicating, by the first UE with the second UE, a sidelink communication using the frequency-interlaced resources,
wherein the communicating comprises:
frequency-multiplexing a physical sidelink control channel (PSCCH) signal and a physical sidelink shared channel (PSSCH) signal on the frequency-interlaced resources based on the configuration, the PSCCH signal comprising sidelink control information (SCI) indicating an assignment of a second frequency interlace of RBs uniformly spaced in the shared radio frequency band for communicating the PSSCH signal;
communicating the SCI in the at least one of a highest-frequency RB or a lowest-frequency RB among the first frequency interlace based on the configuration;
communicating the PSSCH signal in one or more RBs different from the at least one of the highest-frequency RB or the lowest-frequency RB among the first frequency interlace based on the configuration; and
communicating the PSSCH signal further in the second frequency interlace of RBs,
wherein the SCI includes a bitmap including a plurality of bits, and wherein a first bit of the plurality of bits identifies the second frequency interlace, and wherein a second bit of the plurality of bits identifies one of the first frequency interlace or a third frequency interlace different from the first frequency interlace and the second frequency interlace.

9. A method of wireless communication, comprising:
receiving, at a first user equipment (UE), a configuration for frequency-interlaced resources in a shared radio frequency band for sidelink communication between the first UE and a second UE, wherein the frequency-interlaced resources include a first frequency interlace of resource blocks (RBs) uniformly spaced in the shared radio frequency band, wherein the frequency-interlaced resources includes at least one of a highest-frequency RB or a lowest-frequency RB among the first frequency interlace; and
communicating, by the first UE with the second UE based on the configuration, a sidelink communication using the frequency-interlaced resources,
wherein the communicating comprises:
frequency-multiplexing a physical sidelink control channel (PSCCH) signal and a physical sidelink shared channel (PSSCH) signal on the frequency-interlaced resources during a first time period, the PSCCH signal comprising sidelink control information (SCI), the SCI indicating a second time period for further communicating the PSSCH signal;
communicating the SCI in the at least one of a highest-frequency RB or a lowest-frequency RB among the first frequency interlace based on the configuration;
communicating the PSSCH signal in one or more RBs different from the at least one of the highest-frequency RB or the lowest-frequency RB among the first frequency interlace based on the configuration; and
communicating the PSSCH signal further in the first interlace during the second time period based on the SCI.

10. The method of claim 9, further comprising:
selecting, by the first UE, the first frequency interlace in the second time period for communicating the PSSCH signal from the frequency-interlaced resources.

11. A first user equipment (UE) comprising:
a transceiver configured to:
receive, from a network entity, a configuration for frequency-interlaced resources in a shared radio frequency band for sidelink communication between the first UE and a second UE, wherein the configuration for the frequency-interlaced resources indicates a first interlace of resource blocks (RBs), wherein the shared radio frequency band includes a plurality of subbands wherein the RBs of the first interlace are uniformly spaced in the shared radio frequency band, and wherein the configuration indicates a first portion of resources including at least one of a highest-frequency RB or a lowest-frequency RB among the first interlace; and
communicate, with the second UE, a sidelink communication using the frequency-interlaced resources, wherein the transceiver configured to communicate includes the transceiver configured to:
frequency-multiplex, based on the configuration, a physical sidelink control channel (PSCCH) signal and a first portion of a physical sidelink shared channel (PSSCH) signal in the first interlace in a first time period, and wherein the PSCCH signal comprises sidelink control information (SCI) in the at least one of the highest-frequency RB or the lowest-frequency RB among the first interlace, the SCI indicating a second interlace of RBs different from the first interlace, the SCI further indicating which subbands of the plurality of subbands the second interlace is located; and
communicate, based on the SCI, a second portion of the PSSCH signal in the second interlace of RBs.

12. The first UE of claim 11, wherein the transceiver configured to communicate the sidelink communication is further configured to:
communicate, with the second UE, the PSSCH signal in one or more RBs different from the at least one of the highest-frequency RB or the lowest-frequency RB among the first interlace based on the configuration.

13. The first UE of claim 12, wherein the RBs of the second interlace are uniformly spaced in the shared radio frequency band.

14. The first UE of claim 13, wherein the SCI indicates an assignment of the second interlace for communicating the PSSCH signal.

15. The first UE of claim 12, wherein the transceiver configured to communicate the sidelink communication is further configured to:
communicate, with the second UE, the PSSCH signal and the PSCCH signal in the first interlace during first time period based on the configuration, the SCI including an indication of a second time period for communicating the PSSCH signal; and
communicate, with the second UE, the PSSCH signal further in the first interlace during the second time period based on the SCI.

16. The first UE of claim 11, wherein the configuration indicates a first portion of resources including one or more first symbols of a plurality of RBs of the first interlace, and wherein the transceiver configured to communicate the sidelink communication is further configured to:
communicate, with the second UE, the side link communication by time-multiplexing the PSCCH signal in the one or more first symbols and the PSSCH signal in one or more second symbols on the frequency-interlaced resources based on the configuration.

\* \* \* \* \*